US012026800B1

(12) United States Patent
Salter et al.

(10) Patent No.: US 12,026,800 B1
(45) Date of Patent: Jul. 2, 2024

(54) BLITTING A DISPLAY-LOCKED OBJECT

(71) Applicant: Apple Inc., Cupertino, CA (US)

(72) Inventors: Thomas G. Salter, Foster City, CA (US); Gregory Patrick Lane Lutter, Boulder Creek, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/543,530

(22) Filed: Dec. 6, 2021

Related U.S. Application Data

(60) Provisional application No. 63/132,975, filed on Dec. 31, 2020.

(51) Int. Cl.
  *G06T 1/20* (2006.01)
  *G06F 3/0346* (2013.01)
  *G06T 1/60* (2006.01)
  *G06T 3/02* (2024.01)
  *G06T 7/70* (2017.01)

(52) U.S. Cl.
  CPC .............. *G06T 1/20* (2013.01); *G06F 3/0346* (2013.01); *G06T 1/60* (2013.01); *G06T 3/02* (2024.01); *G06T 7/70* (2017.01)

(58) Field of Classification Search
  CPC  G06T 1/20; G06T 3/0006; G06T 7/70; G06T 1/60; G06F 3/0346
  See application file for complete search history.

(56) References Cited

U.S. PATENT DOCUMENTS

| | | | |
|---|---|---|---|
| 9,215,293 B2 | 12/2015 | Miller | |
| 9,317,175 B1 | 4/2016 | Lockhart | |
| 10,175,483 B2 | 1/2019 | Salter et al. | |
| 2012/0249741 A1* | 10/2012 | Maciocci | G06T 19/006 348/51 |
| 2015/0042832 A1* | 2/2015 | Warnberg | H04N 5/23293 348/239 |
| 2018/0204365 A1* | 7/2018 | Lee | G06T 7/55 |
| 2018/0374267 A1* | 12/2018 | Yurkin | G06K 19/06103 |

* cited by examiner

*Primary Examiner* — Samantha (Yuehan) Wang
(74) *Attorney, Agent, or Firm* — Fernando & Partners, LLP

(57) ABSTRACT

A method is performed at an electronic device with a controller and a display. The method includes identifying, within a first memory, a first object that satisfies a locked criterion. For example, the first object corresponds to a head-locked object or a body-locked object. The first object is associated with a first plurality of pixel values. The method includes blitting, via the controller, the first plurality of pixel values from the first memory to a second memory. The method includes displaying, on the display, the first object by obtaining the first plurality of pixel values from the second memory. In some implementations, the method includes rendering, via a graphics processing unit (GPU), a second object that does not satisfy the locked criterion, such as a world-locked object. As compared with GPU rendering, blitting is less computationally expensive.

22 Claims, 22 Drawing Sheets

BLITTING A DISPLAY-LOCKED OBJECT

CROSS-REFERENCE TO RELATED APPLICATIONS

This application claims priority to U.S. Provisional Patent App. No. 63/132,975 filed on Dec. 31, 2020, which is hereby incorporated by reference in its entirety.

TECHNICAL FIELD

The present disclosure relates to displaying objects, and in particular performing blitting with respect to a particular object in order to display the particular object.

BACKGROUND

Generating display data typically includes utilizing a graphics processing unit (GPU). For example, the GPU renders a model in order to generate rendered image data for display. The model defines various attributes, such as geometry, viewpoint, texture, lighting, and shading information. However, rendering a particular model is computationally expensive for the GPU because of complex mathematical operations associated with processing the various attributes.

SUMMARY

In accordance with some implementations, a method is performed at an electronic device with a controller and a display. The method includes identifying, within a first memory, a first object that satisfies a locked criterion. The first object is associated with a first plurality of pixel values. The method includes blitting, via the controller, the first plurality of pixel values from the first memory to a second memory. The method includes displaying, on the display, the first object by obtaining the first plurality of pixel values from the second memory.

In accordance with some implementations, an electronic device includes a controller and a display. In some implementations, the controller corresponds to a processor that executes one or more programs. The one or more programs may be stored in a non-transitory computer readable storage medium. The one or more programs include instructions for performing or causing performance of the operations of any of the methods described herein. In accordance with some implementations, a non-transitory computer readable storage medium has stored therein instructions which when executed by the controller of an electronic device, cause the electronic device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

DESCRIPTION OF IMPLEMENTATIONS

Figure 1:
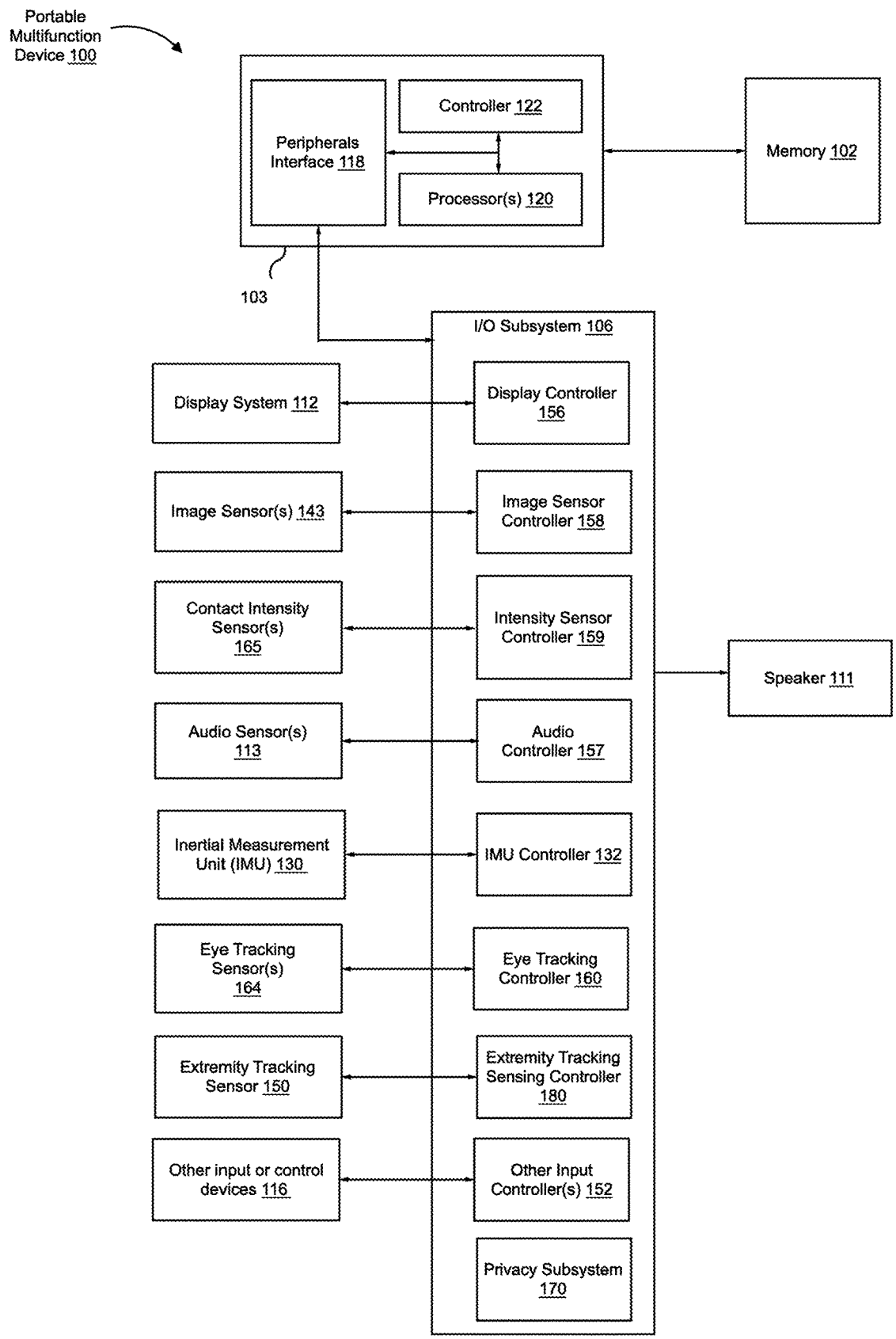
FIG. 1 is a block diagram of an example of a portable multifunction device in accordance with some implementations.

An electronic device may include a graphics processing unit (GPU). The GPU renders one or more models in order to generate corresponding rendered image data for display. A particular model defines various attributes, such as geometry, viewpoint, texture, lighting, and shading information. The one or more models include a combination of two-dimensional (2D) and three-dimensional (3D) models, and the model(s) may be defined in a file (e.g., a scene file) or datastore. However, rendering a particular model is computationally expensive for the GPU because of complex mathematical operations associated with processing the various attributes. For example, in order to render a particular model, the GPU implements (e.g., solves) a rendering equation that accounts for lighting information related to the particular model.

By contrast, various implementations disclosed herein include methods, electronic devices, and systems for blitting (rather than GPU rendering) an object when the object satisfies a locked criterion. To that end, an electronic device with a controller and a display identifies, within a first memory, a first object that satisfies a locked criterion. The first object is associated with a first plurality of pixel values. For example, in some implementations, the first object corresponds to one of a head-locked object or a body-locked object. The blitting may correspond to a bitwise copy and paste operation. The electronic device displays the first object by obtaining the first plurality of pixel values from the second memory. By blitting an object that satisfies the locked criterion, the electronic device foregoes performing complex operations associated with rendering the object via a GPU. Accordingly, the electronic device uses less processing resources, as compared with other devices that utilize GPU rendering alone, independent of object type.

In some implementations, based on satisfaction of the locked criterion, the electronic device reduces resource utilization associated with a sensor or subsystem. For example, the electronic device changes a positional sensor (e.g., an IMU) from a six degree-of-freedom (6 DOF) mode of operation to a 3 DOF or 0 DOF mode of operation. As another example, the electronic device reduces a brightness value associated with the display (e.g., selectively turns off or reduces intensity of backlighting).

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic systems. The physical environment may include physical features such as a physical surface or a physical object. For example, the physical environment corresponds to a physical park that includes physical trees, physical buildings, and physical people. People can directly sense and/or interact with the physical environment, such as through sight, touch, hearing, taste, and smell. In contrast, an extended reality (XR) environment refers to a wholly or partially simulated environment that people sense and/or interact with via an electronic system. An XR environment may correspond to one of a virtual reality (VR) environment, an augmented reality (AR) environment, or a mixed reality (MR) environment. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. As another example, an XR system corresponds to a mobile device (e.g., a smartphone or tablet) that detects a movement of the mobile device relative to an XR environment and accordingly modifies displayed content within the XR environment. In some situations (e.g., for accessibility reasons), adjustments to characteristic(s) of virtual object(s) in an XR environment may be made in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HID), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, and a privacy subsystem 170. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, finger-wearable device, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a particular object. In some implementations, the other input or control devices 116 include a depth sensor and/or a time of flight sensor that obtains depth information characterizing a particular object.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 112 may have a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a finger-wearable device.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

The user optionally makes contact with the display system 112 using any suitable object or appendage, such as a stylus, a finger-wearable device, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMID), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a particular object. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2:
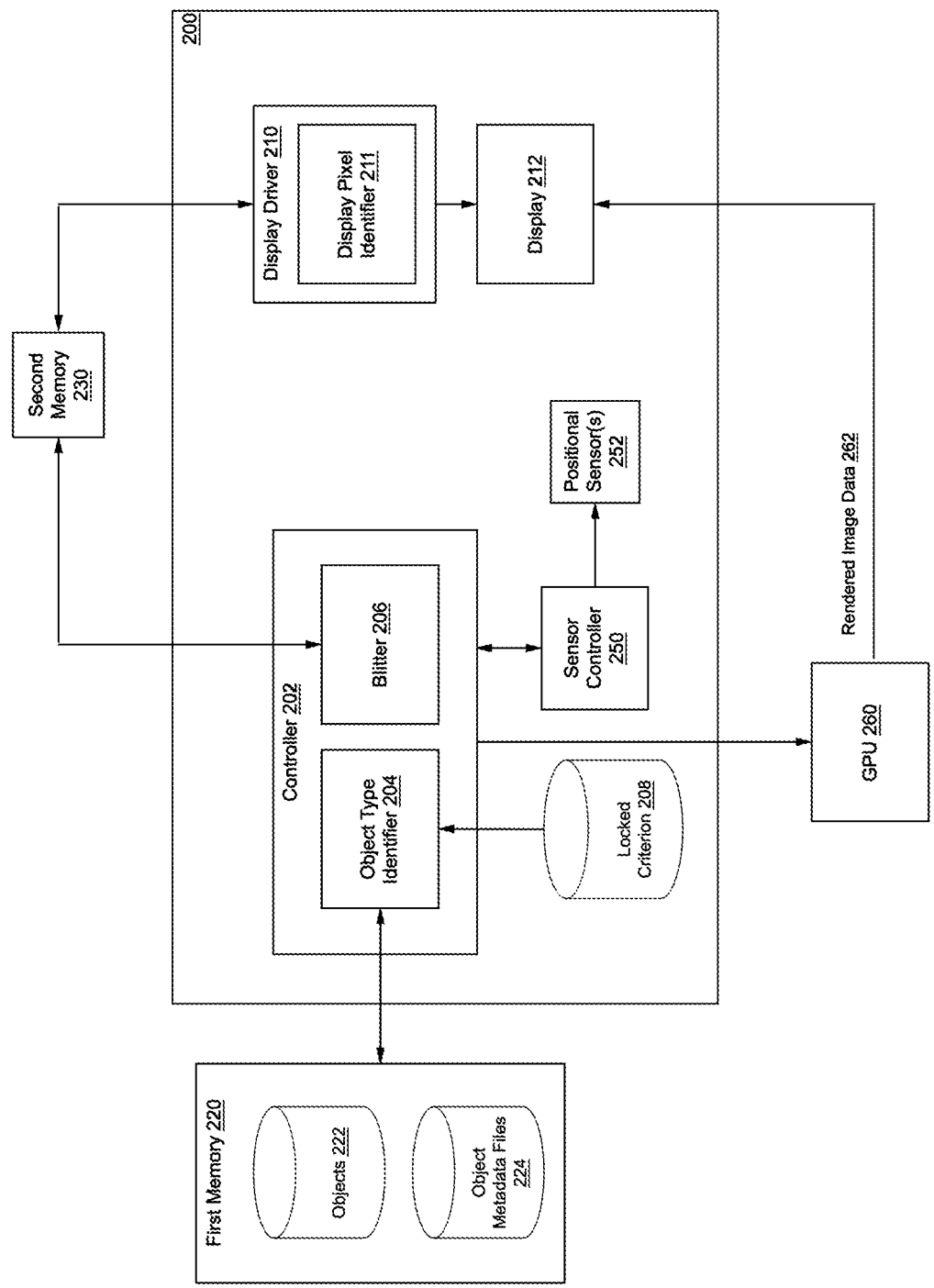
FIG. 2 is an example of a block diagram of a system for blitting an object that satisfies a locked criterion in accordance with some implementations.

FIG. 2 is an example of a block diagram of a system 200 for blitting an object that satisfies a locked criterion in accordance with some implementations. To that end, the system 200 includes a controller 202 and a display 212. In some implementations, the system 200 includes a locked criterion datastore 208 that stores a locked criterion. Whether or not the system 200 blits a particular object is a function of the locked criterion, as will be described below. According to various implementations, the system 200 or portions thereof is integrated in an electronic device (e.g., the electronic device 100 in FIG. 1 or the electronic device 310 in FIGS. 3A-3S). While pertinent features of the system 200 are shown, those of ordinary skill in the art will appreciate from the present disclosure that various other features have not been illustrated for the sake of brevity and so as not to obscure more pertinent aspects of the example implementations disclosed herein.

In some implementations, the controller 202 includes an object type identifier 204 that identifies various objects stored in an objects datastore 222 of a first memory 220. The objects include a combination of 2D and 3D objects, which are to be displayed on the display 212. For example, a 2D object may correspond to a menu or interface, such as a heads-up display (HUD). As another example, a 3D object may correspond to a computer-generated couch that is associated with a particular location within a physical environment. Although the first memory 220 is illustrated as being separate from the system 200, in some implementations, the system 200 includes the first memory 220 (e.g., the first memory 220 is integrated within the system 200).

The object type identifier 204 identifies, within the first memory 220, a first object that satisfies the locked criterion. The first object is associated with a first plurality of pixel values. For example, each of the first plurality of pixel values defines a brightness and/or color of a corresponding pixel of an image. As another example, each of the first plurality of pixel values corresponds to an RGB value. In some implementations, the object type identifier 204 identifies the first object as satisfying the locked criterion when the first object is a head-locked object or a body-locked object.

A display-locked object (sometimes referred to or similar to a "head-locked object") is locked to particular position of the display 212. For example, a display-locked object corresponds to a heads-up display (HUD) that is locked to slightly above the center point of the display 212. Accordingly, in response to a positional change (e.g., a rotation or translational movement) of an electronic device, the electronic device maintains display of the display-locked object at the particular position of the display 212. In contrast to a world-locked object, the position of the display-locked object within the display 212 is independent of a current physical environment that is associated with the electronic device as well as the position and orientation of the electronic device within the physical environment. Although at a given time the displayed-object is locked to a particular position of the display 212, the particular position may be changed. For example, in response to receiving a user input, an electronic device moves a menu from being locked to the upper right corner of the display 212 to being locked to the upper left corner of the display 212.

A body-locked object is locked to a portion of a body of a user. For example, a head-mountable device (HMD) maintains display of the body-locked object at a particular distance (e.g., depth) from the portion of the body of the user and at a particular angular offset with respect to the portion of the body of the user. For example, a timer widget is body-locked at one meter away from the torso of the user and at 45 degrees left of the center of the torso. Initially, the HMD, worn by a user, displays the timer widget on the display 212 so as to appear to be one meter away from the torso, at 45 degrees left of the center of the torso. Continuing with this example, while the torso is stationary, the head of the user and the HMD turn leftwards, and the HMD detects the leftwards rotation (e.g., via an IMU). In response to detecting the leftwards rotation, the HMD correspondingly moves the timer widget rightwards on the display 212 in order to maintain the timer widget at 45 degrees left of the center of the torso. Accordingly, in contrast to a display-locked object, the position of the body-locked object on the display 212 may change based on a rotational change of the HMD. As another example, in response to detecting a translational movement (e.g., the user walks to a different room in a house), the HMD maintains the body-locked object at the particular distance from the portion of the body of the user and at the particular angular offset with respect to the portion of the body of the user. Accordingly, in contrast to a world-locked object, the HMD displays the body-locked object so as to appear to follow the HMD based on a translational movement of the HMD.

A world-locked object is locked to a volumetric region or a specific point of a particular physical environment. Accordingly, the world-locked object is displayed when a viewable region associated with the display 212 includes the volumetric region or the specific point. In response to a position or orientation change of the electronic device, the appearance of the world-locked object changes. For example, in response to a rotation of the electronic device, the world-locked object moves to a different location on the display 212 or ceases to be displayed. As another example, as the electronic device moves towards the world-locked object, the world-locked objects appear larger. Although at a given time the world-locked object is locked to a volumetric region, the volumetric region may be changed. For example, based on one or more user inputs, the electronic device selects and moves a computer-generated couch to a different location within a living room.

According to various implementations, the object type identifier 204 utilizes one or more object metadata files (e.g., received from an object metadata files datastore 224 of the first memory 220) in order to identify one or more corresponding objects that do or do not satisfy the locked criterion. Each of the object metadata file(s) is associated with a corresponding object. In some implementations, a particular object metadata file includes a tag and/or annotation that indicates metadata information associated with a corresponding object. For example, a first object metadata file indicates that a first object is display-locked, whereas a second object metadata file indicates that a second object is world-locked. As another example, an object metadata file indicates whether a corresponding object is a 2D object or a 3D object. The metadata may be generated by a developer who developed the object. In some implementations, a particular object metadata file indicates a positional value associated with a corresponding object, as will be described, below.

According to various implementations, the system 200 defines the metadata. In some implementations, a user input specifies a particular display mode (e.g., display-locked, body-locked, or world-locked) for the first object, and the system 200 stores the particular display mode in the object metadata files datastore 224. In some implementations, the metadata includes one or more of a use case indicator value or a context indicator value. For example, the use case indicator value indicates a furniture shopping use case. Continuing with this example, the system 200 accordingly identifies the first object as a world-locked object in order to provide feedback to a user regarding the appearance of virtual furniture when locked to a particular point within a physical environment.

The controller 202 includes a blitter 206 that blits the first object based on the first object satisfying the locked criterion. The blitter 206 blits the first plurality of pixel values, which are associated with the first object, from the first memory 220 to a second memory 230. In some implementations, the blitter 206 writes (e.g., transmits) the first plurality of pixel values from the first memory 220 to the second memory 230, such as via a bitwise operation. The second memory 230 may be associated with the display 212. For example, the second memory 230 corresponds to a display buffer (e.g., a frame buffer or video buffer) that buffers pixels values for the display 212. In some implementations, the second memory 230 is closer in the graphics pipeline to the display 212 than is the first memory 220. Accordingly, by using pixel values from the second memory 230 (rather than from the first memory 220), the system 200 experiences less latency. Although the second memory 230 is illustrated as being separate from the system 200, in some implementations, the system 200 includes the second memory 230 (e.g., the second memory 230 is integrated within the system 200). In some implementations, the blitter 206 transmits to the second memory 230 a positional value, which is utilized by a display driver 210.

In some implementations, the system 200 includes a display driver 210. The display driver 210 drives the display 212 by obtaining the first plurality of pixel values from the second memory 230. For example, the display driver 210 writes the first plurality of pixel values to a corresponding plurality of pixels of the display 212. To that end, in some implementations, the display driver 210 includes a display pixel identifier 211 that identifies the corresponding plurality of pixels of the display 212. For example, in some implementations, the controller 202 obtains, from the first memory 220, a first positional value that is associated with the first object, and transmits the first positional value to the second memory 230. The first object metadata file may indicate the first positional value. As one example, the first positional value indicates that the first object is to be displayed at a central position. Continuing with this example, the display pixel identifier 211 identifies a corresponding plurality of pixels of the display 211 corresponding to the center of the display 212. For example, the display pixel identifier 211 identifies the corresponding plurality of pixels of the display 212 based on a function of the first positional value, the first plurality of pixel values (e.g., defining the dimensions of the first object), and characteristic(s) of the display 212 (e.g., display size, display resolution, etc.).

In some implementations, based on the object type identifier 204 identifying the first object that satisfies the locked criterion, the display driver 210 reduces a resource utilization associated with the display 212. For example, the display driver 210 reduces the amount of backlight illumination associated with the display 212, such as by selectively dimming a portion of the display 212 that corresponds to the display position of the first object.

In some implementations, the system 200 includes a sensor controller 250 that controls one or more positional sensors 252 capable of determining a position, orientation, or both, of the system 200. Examples of the positional sensor(s) 252 include a simultaneous localization and mapping (SLAM) sensor, an eye gaze sensor, a visual inertial odometry (VIO) sensor, inertial measurement unit (IMU) sensor, etc. In some implementations, based on the object type identifier 204 identifying the first object that satisfies the locked criterion, the sensor controller 250 reduces a resource utilization level associated with a respective one of the positional sensor(s) 252. In some implementations, the sensor controller 250 changes a mode of operation of a positional sensor 252 from a 6 DOF mode to a 3 DOF mode or 0 DOF mode. For example, the sensor controller 250 changes a mode of operation of the positional sensor 252 from a 6 DOF mode to a 0 DOF mode when the first object corresponds to a head-locked object. As another example, the sensor controller 250 changes a mode of operation of the positional sensor 252 from a 6 DOF mode to a 3 DOF mode when the first object corresponds to a body-locked object. In some implementations, the sensor controller 250 changes a positional sensor 252 from a standard power mode to a lower power mode.

Accordingly, by reducing resource utilization associated with the display 212 and/or the positional sensor(s) 252, the system 200 reduces overall processing utilization.

In some implementations, the object type identifier 204 identifies, within the first memory, a second object that does not satisfy the locked criterion. For example, the second object is a world-locked object. Rather than blitting the second object, the controller 202 transmits the second object to a graphics processing unit (GPU) 260. The GPU 260 renders the second object in order to generate rendered image data 262 to be displayed on the display 212. Examples of GPU rendering include wireframe rendering, polygon-based rendering, scanline rendering, ray tracing, radiosity, etc. As compared with blitting, GPU rendering is more computationally expensive because GPU rendering accounts for various attributes associated with the second object, such as geometry, viewpoint, texture, lighting, and shading information. Although the GPU 260 is illustrated as being separate from the system 200, in some implementations, the system 200 includes the GPU 260 (e.g., the GPU 260 is integrated within the system 200).

Thus, by selectively blitting one or more objects in order to display the object(s), the system 200 foregoes performing complex GPU rendering operations with respect to the object(s). Accordingly, the system 200 utilizes less processing resources as compared with other systems.

Figure 3A:
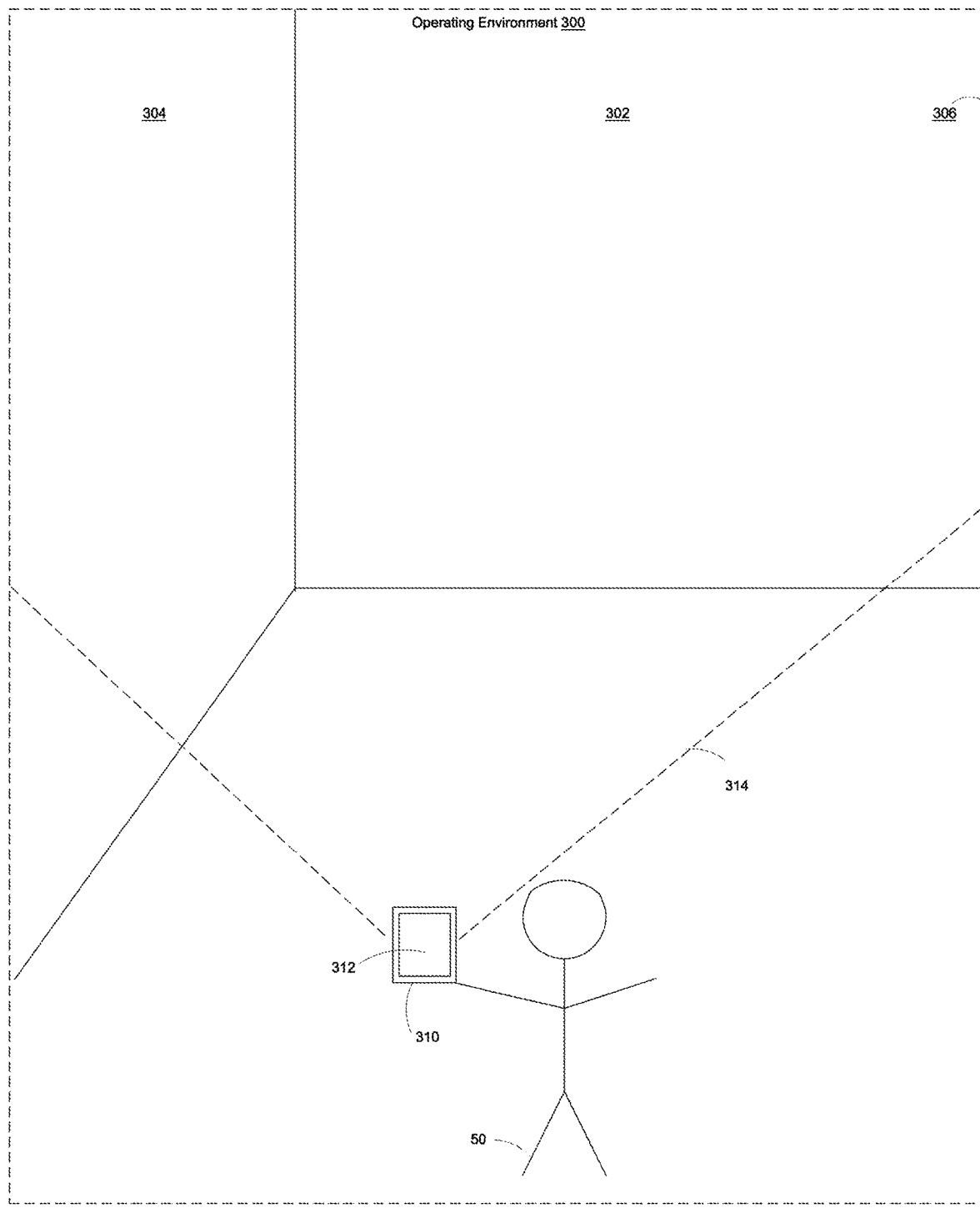
FIGS. 3A-3S are examples of an electronic device blitting objects that satisfy a locked criterion in accordance with some implementations.
Figure 3B:
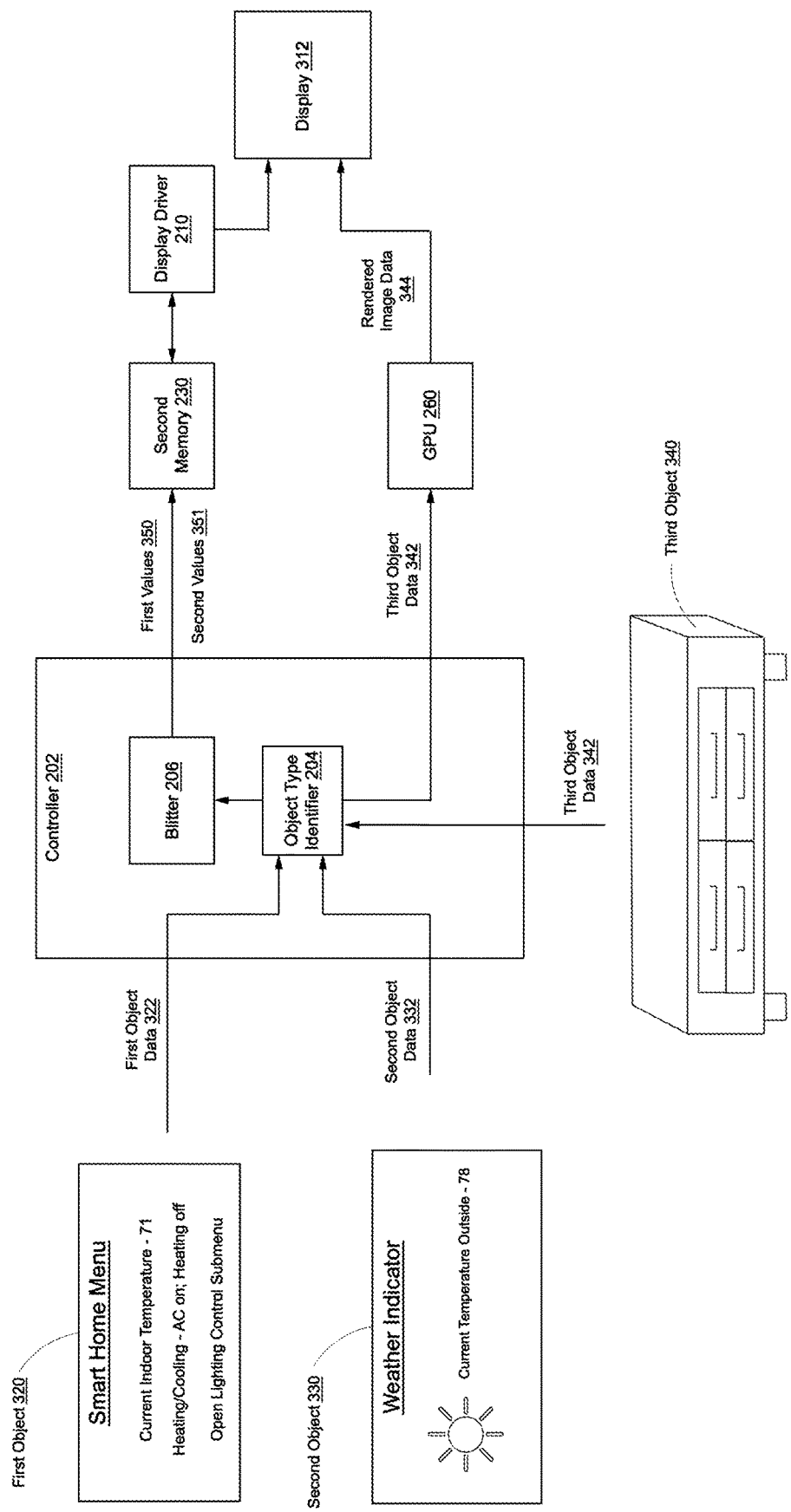
Figure 3C:
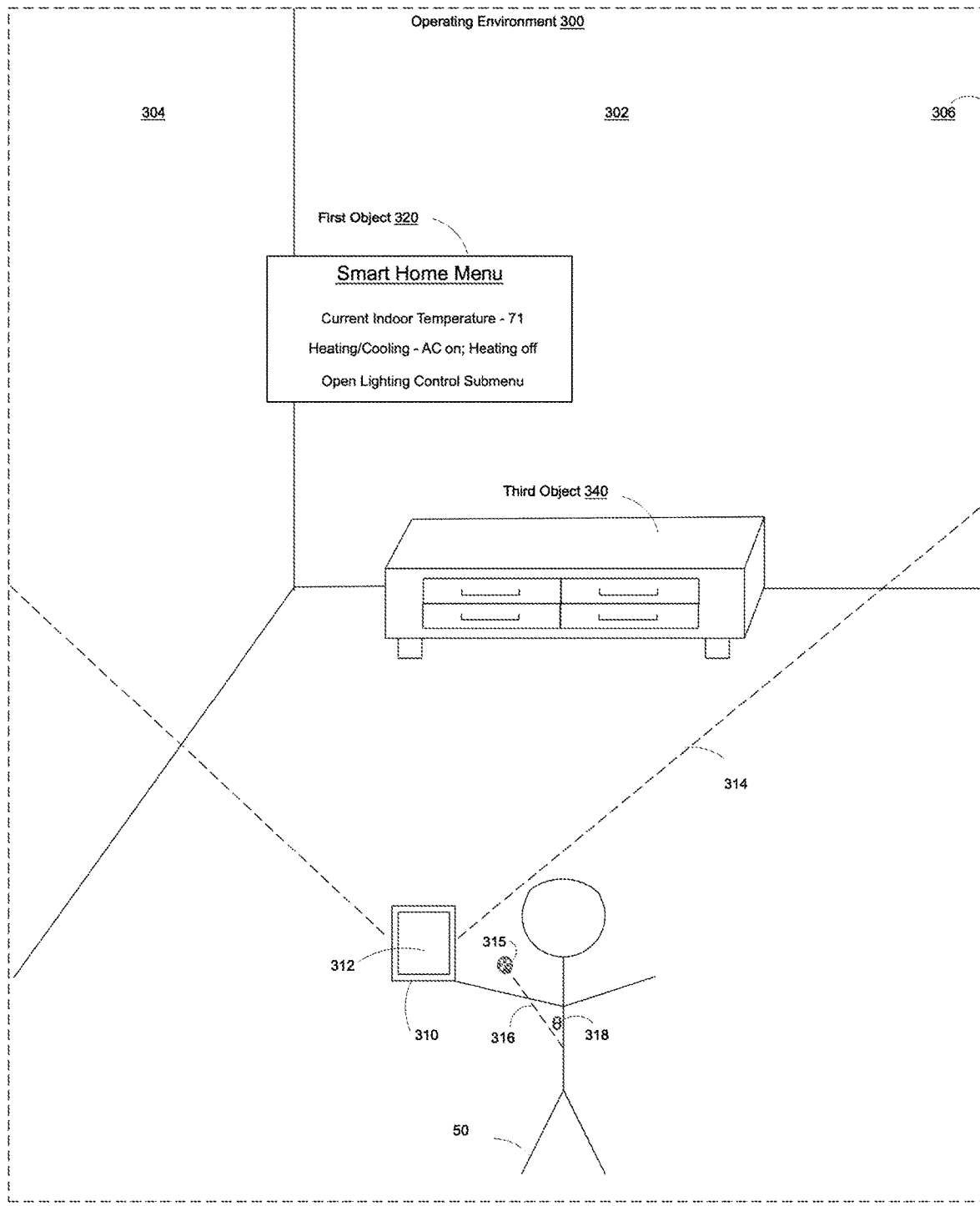
Figure 3D:
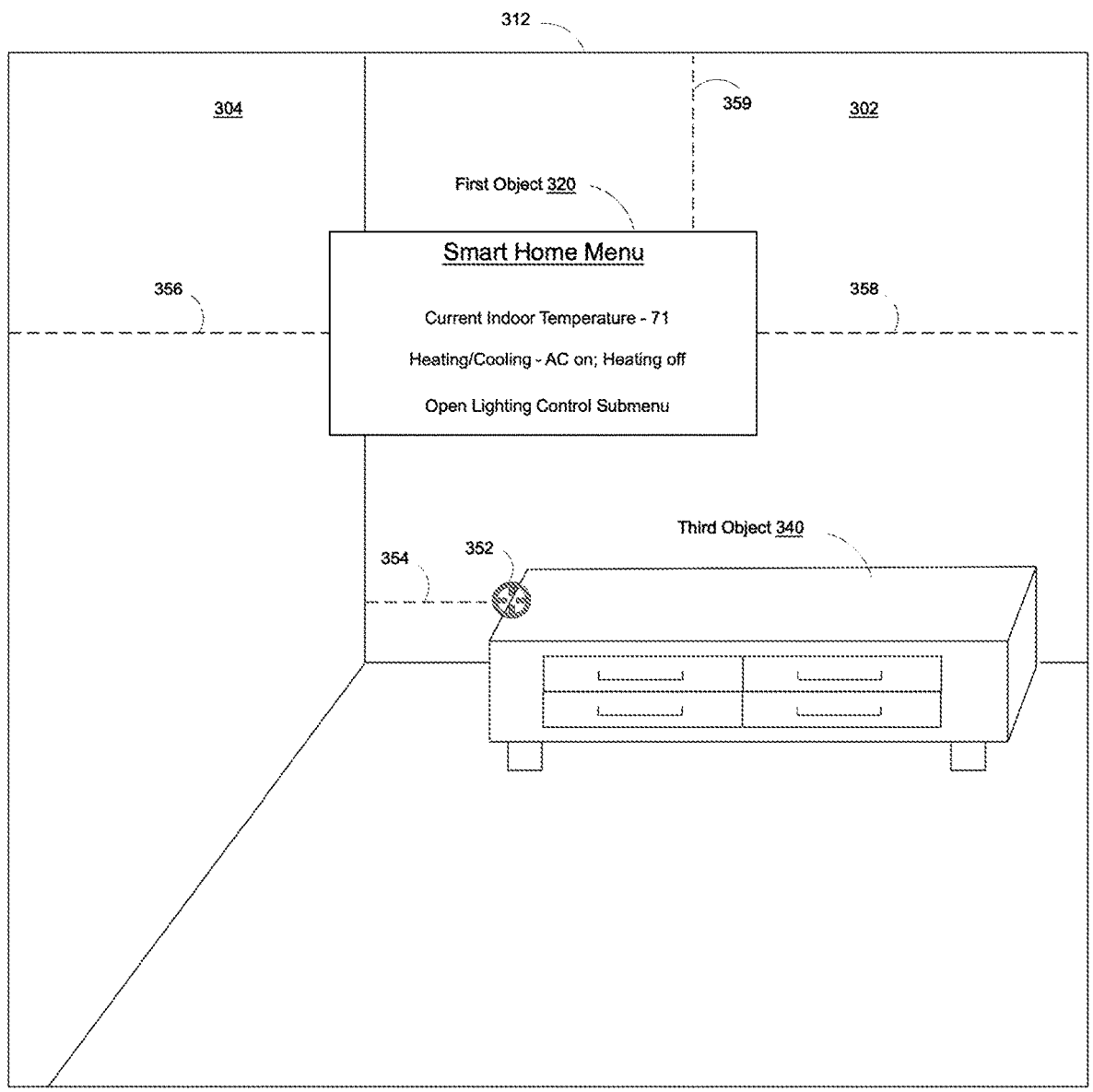
Figure 3E:
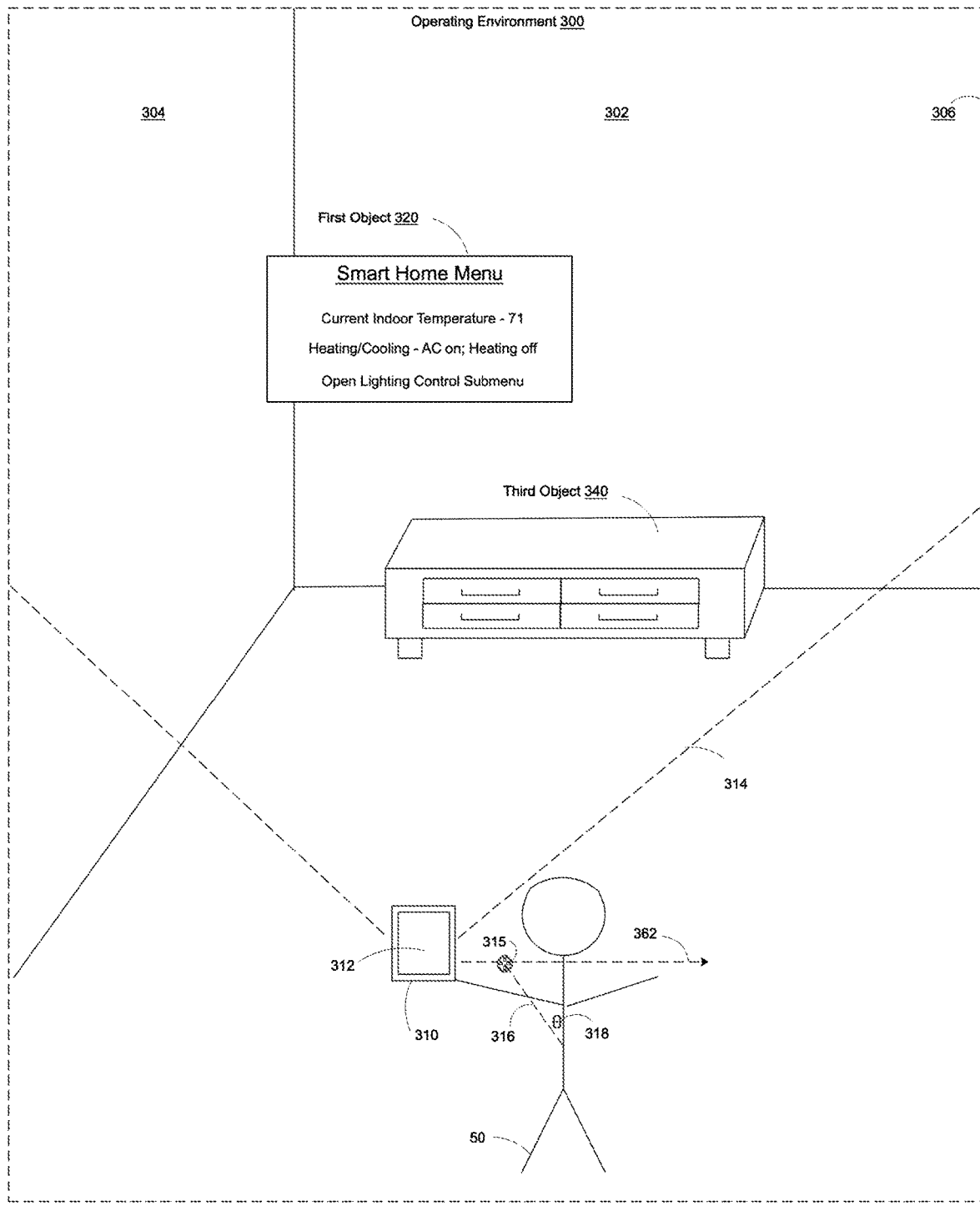
Figure 3F:
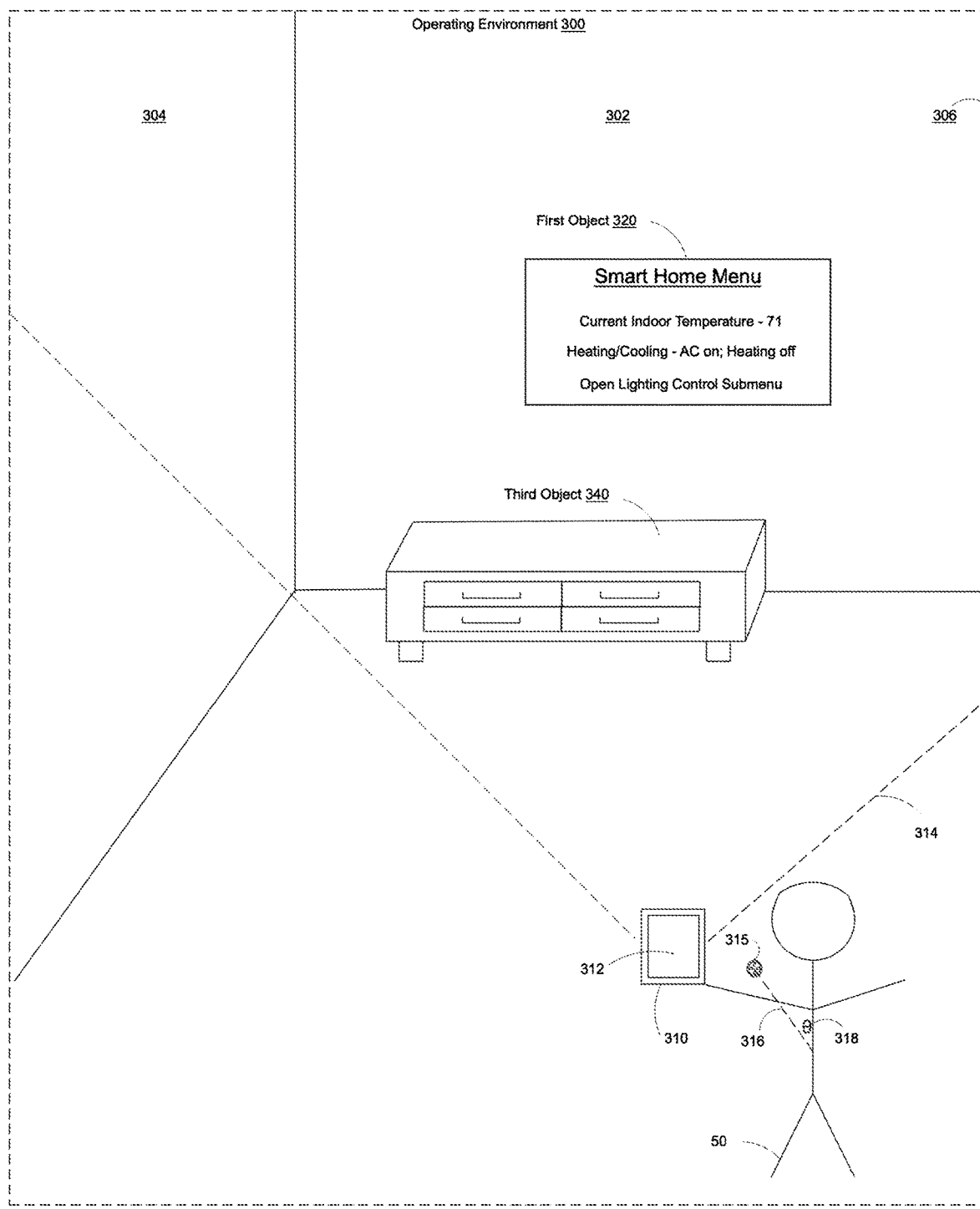
Figure 3G:
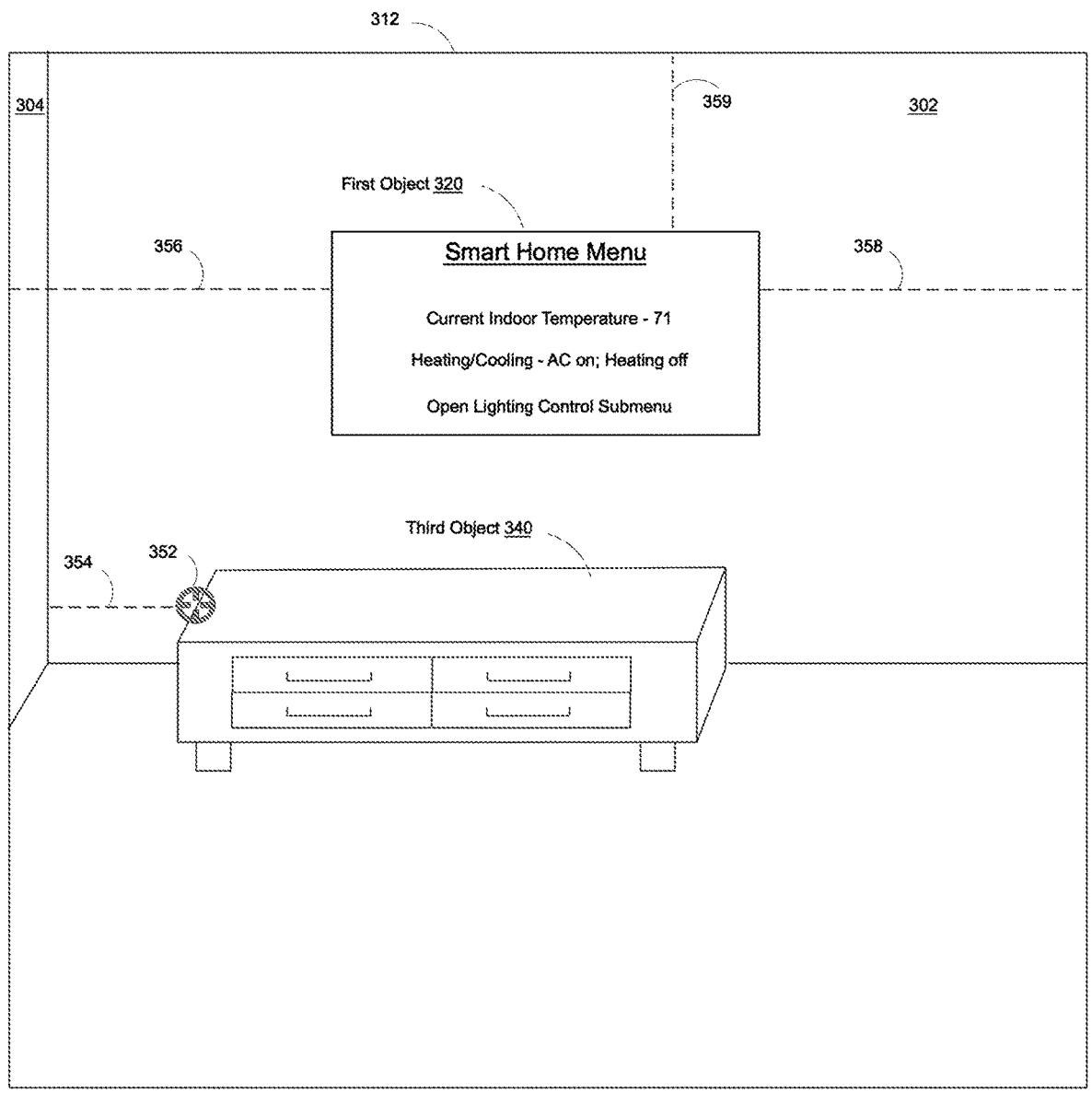
Figure 3H:
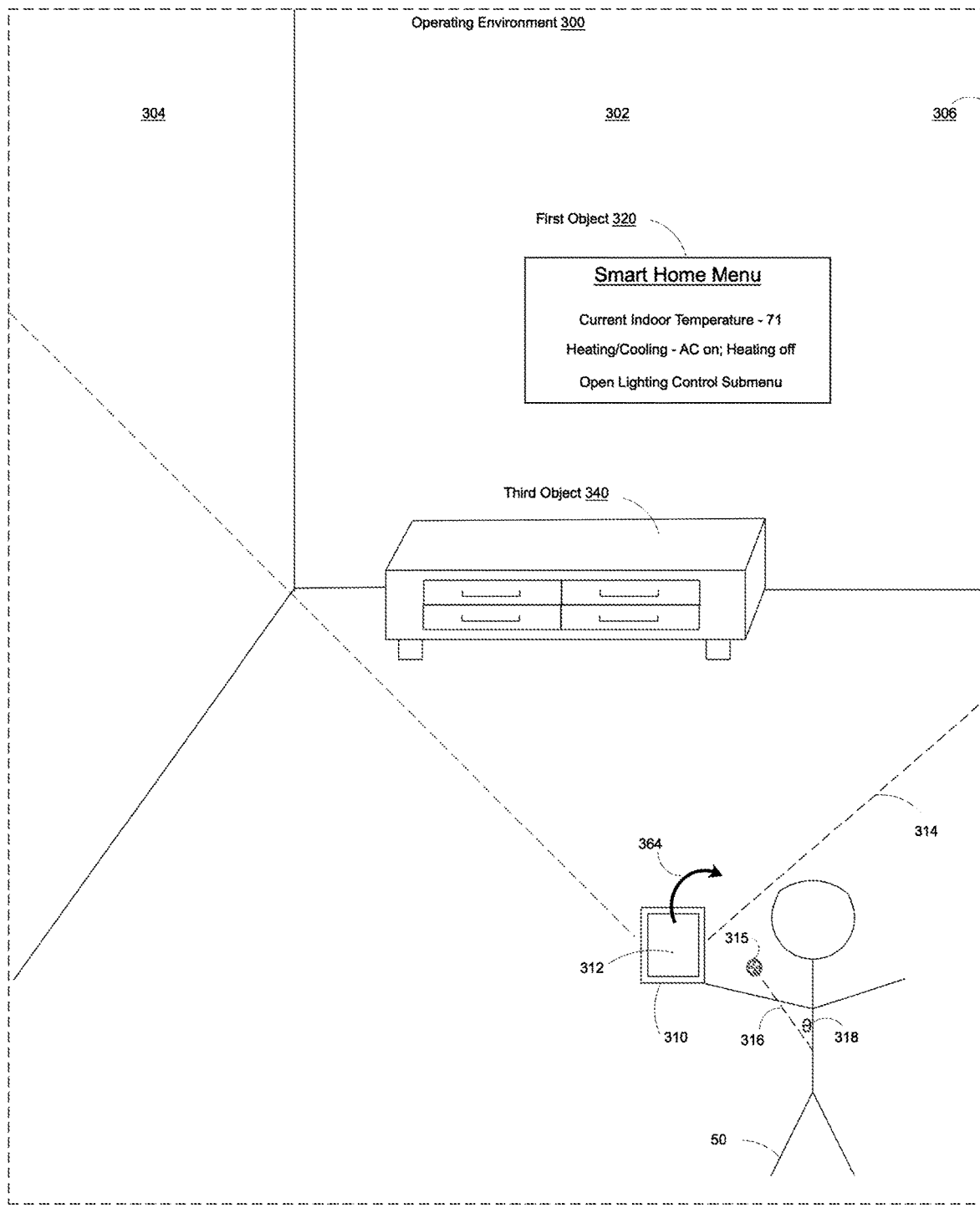
Figure 3I:
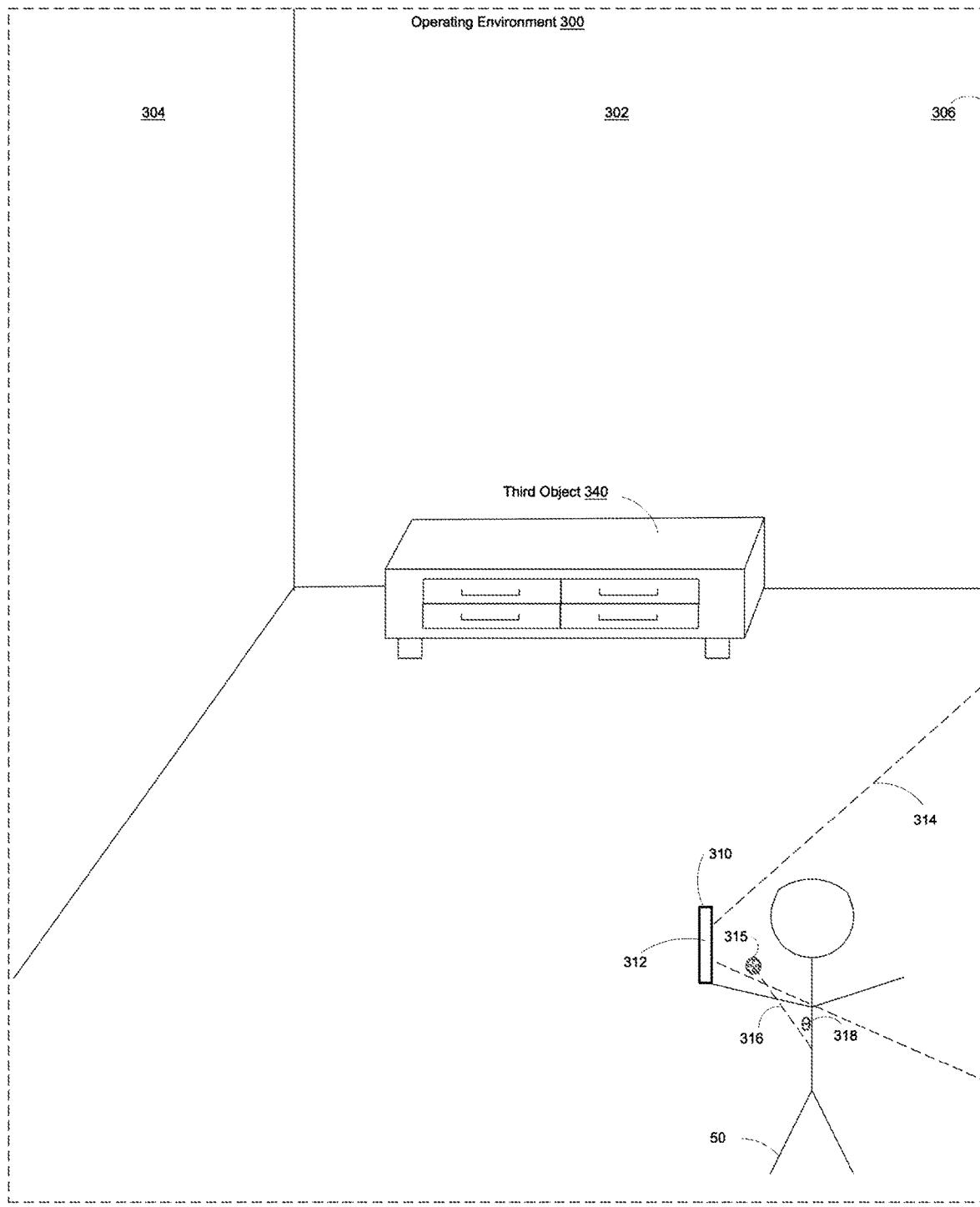
Figure 3J:
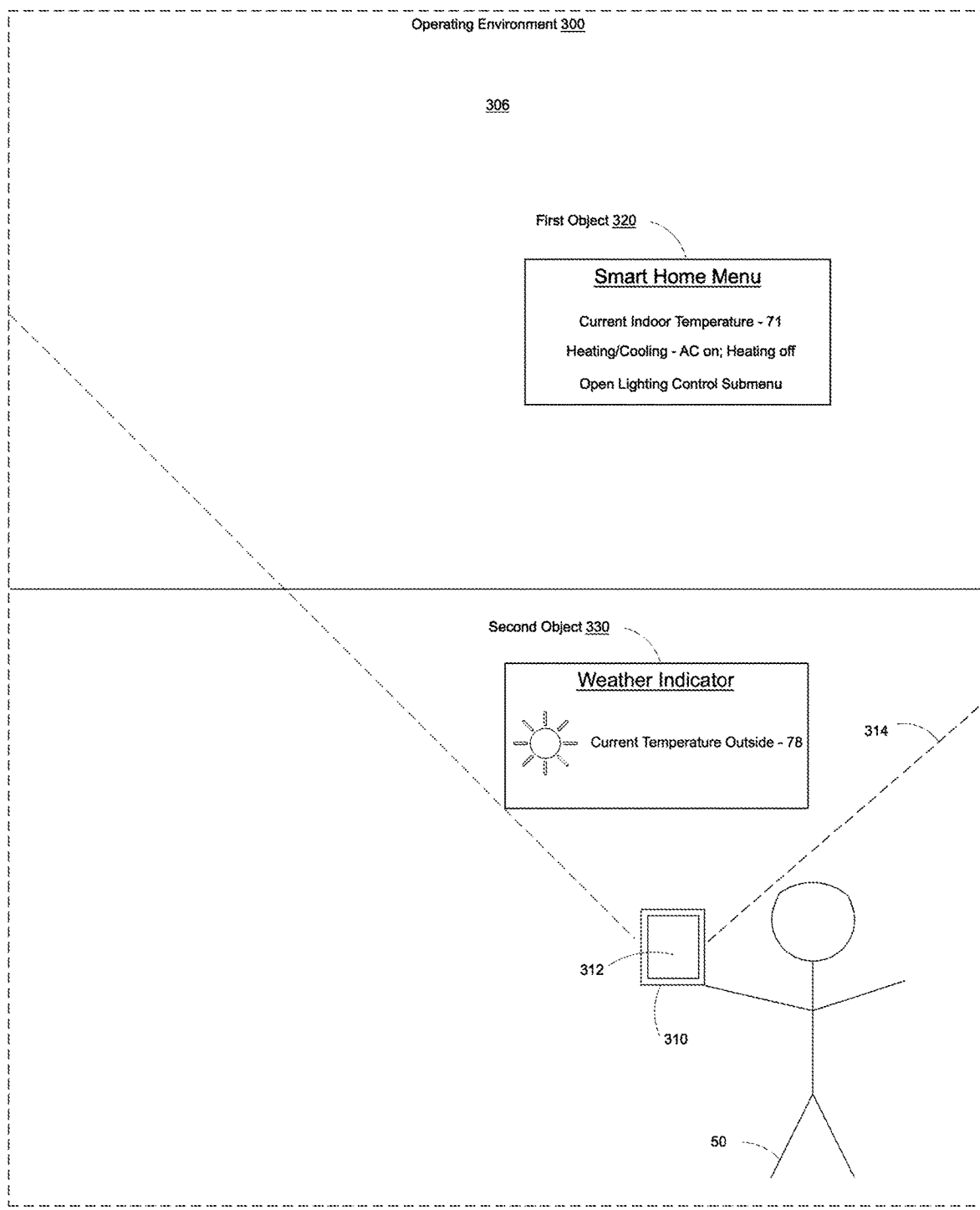
Figure 3K:
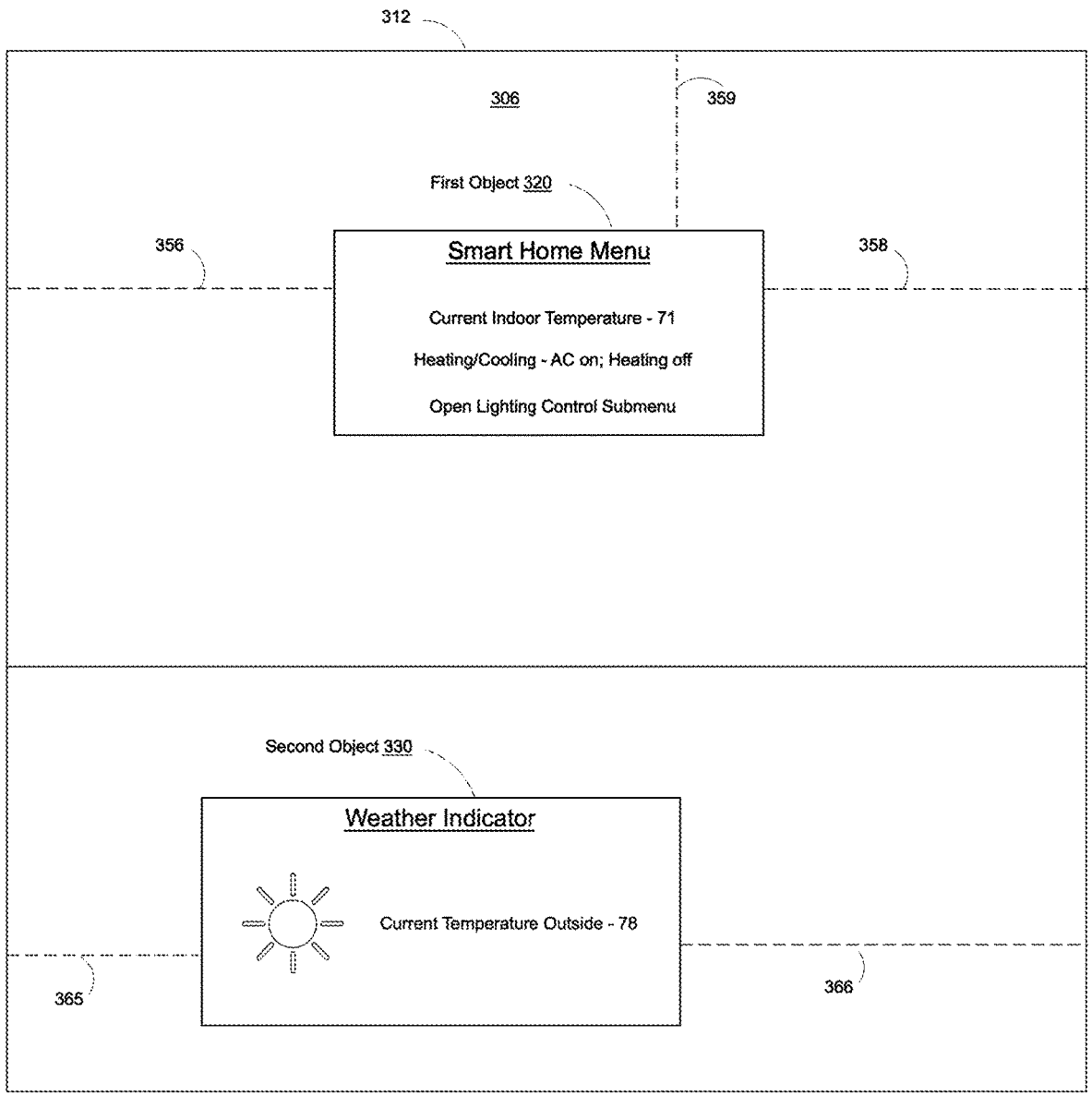
Figure 3L:
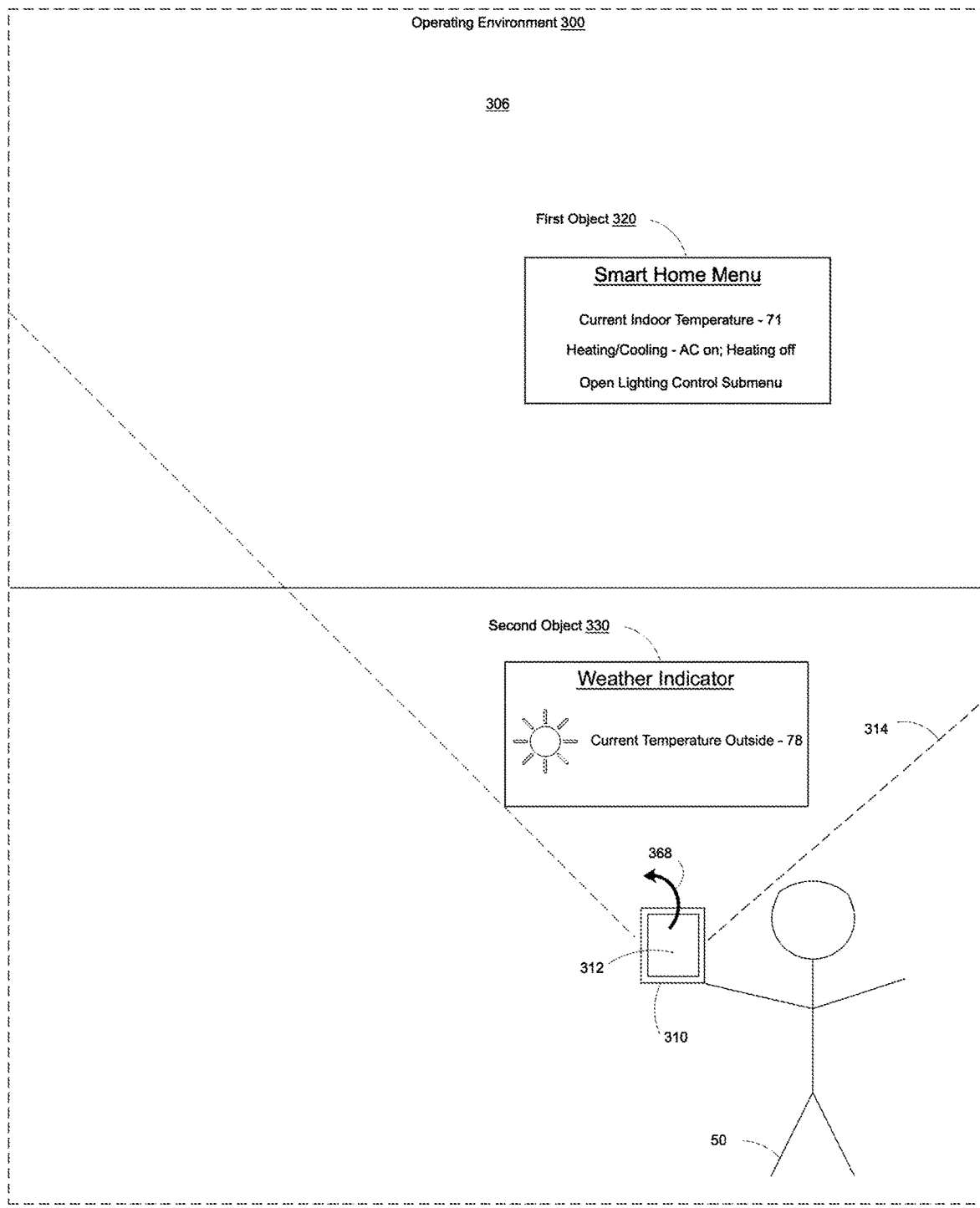
Figure 3M:
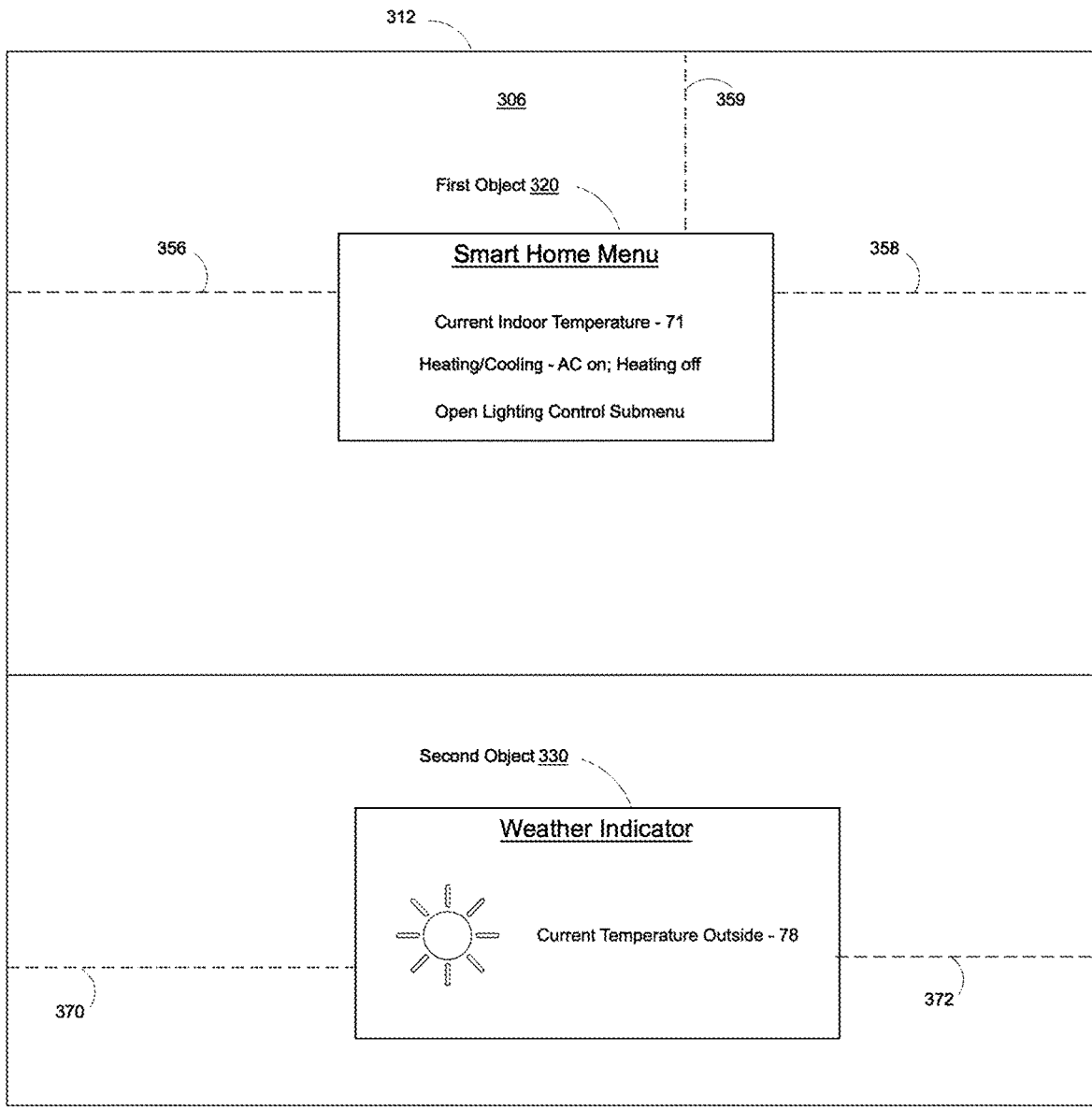
Figure 3N:
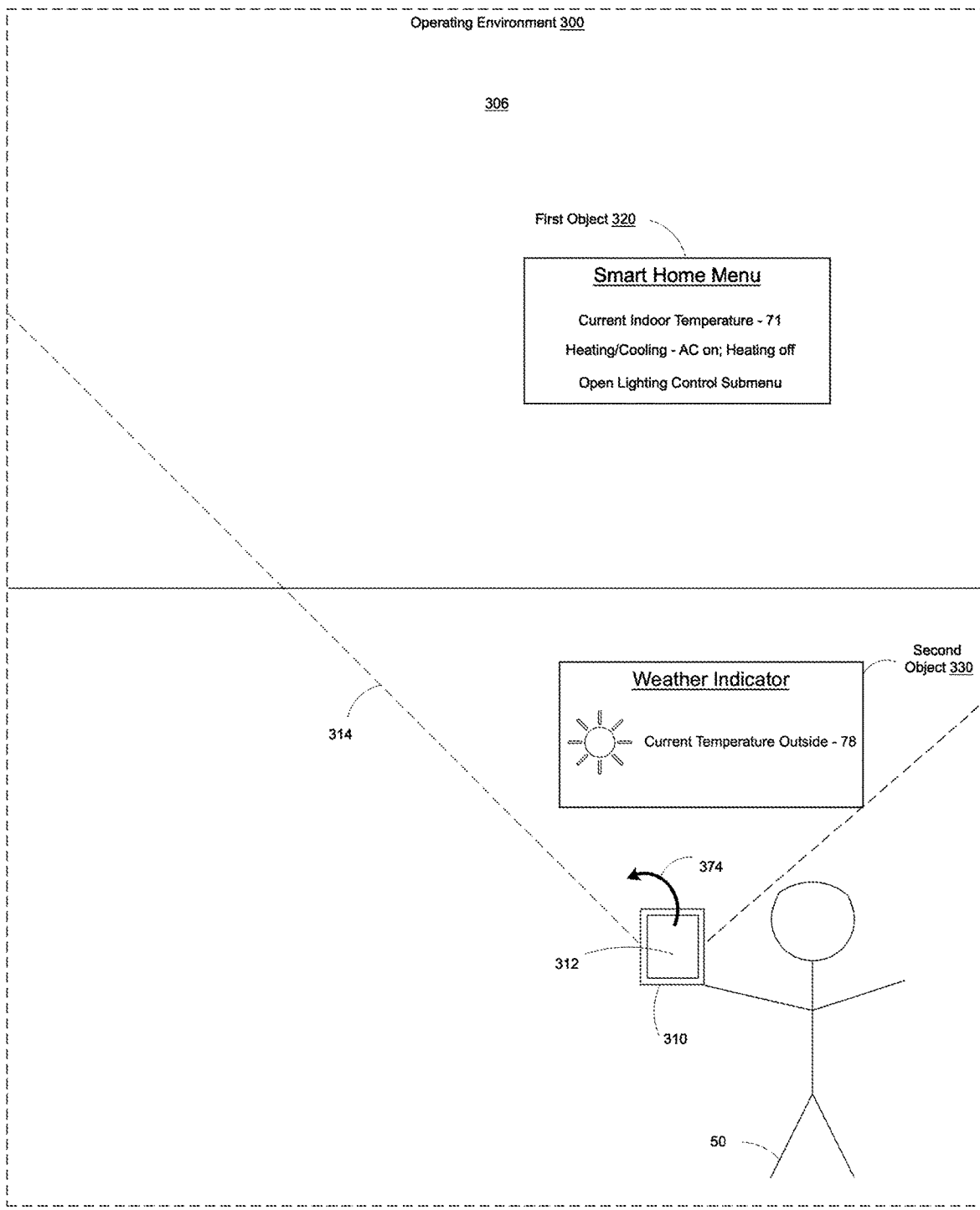
Figure 3O:
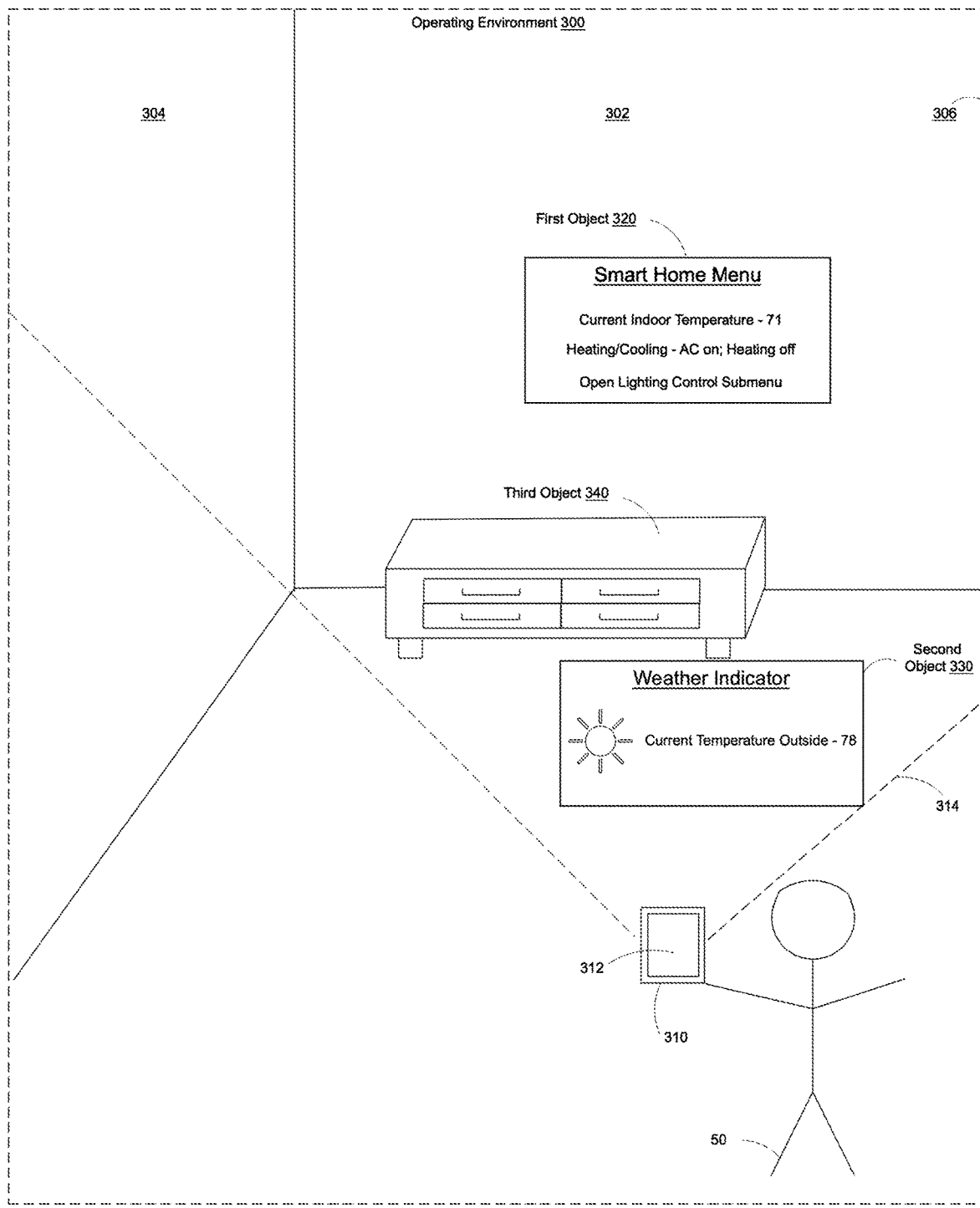
Figure 3P:
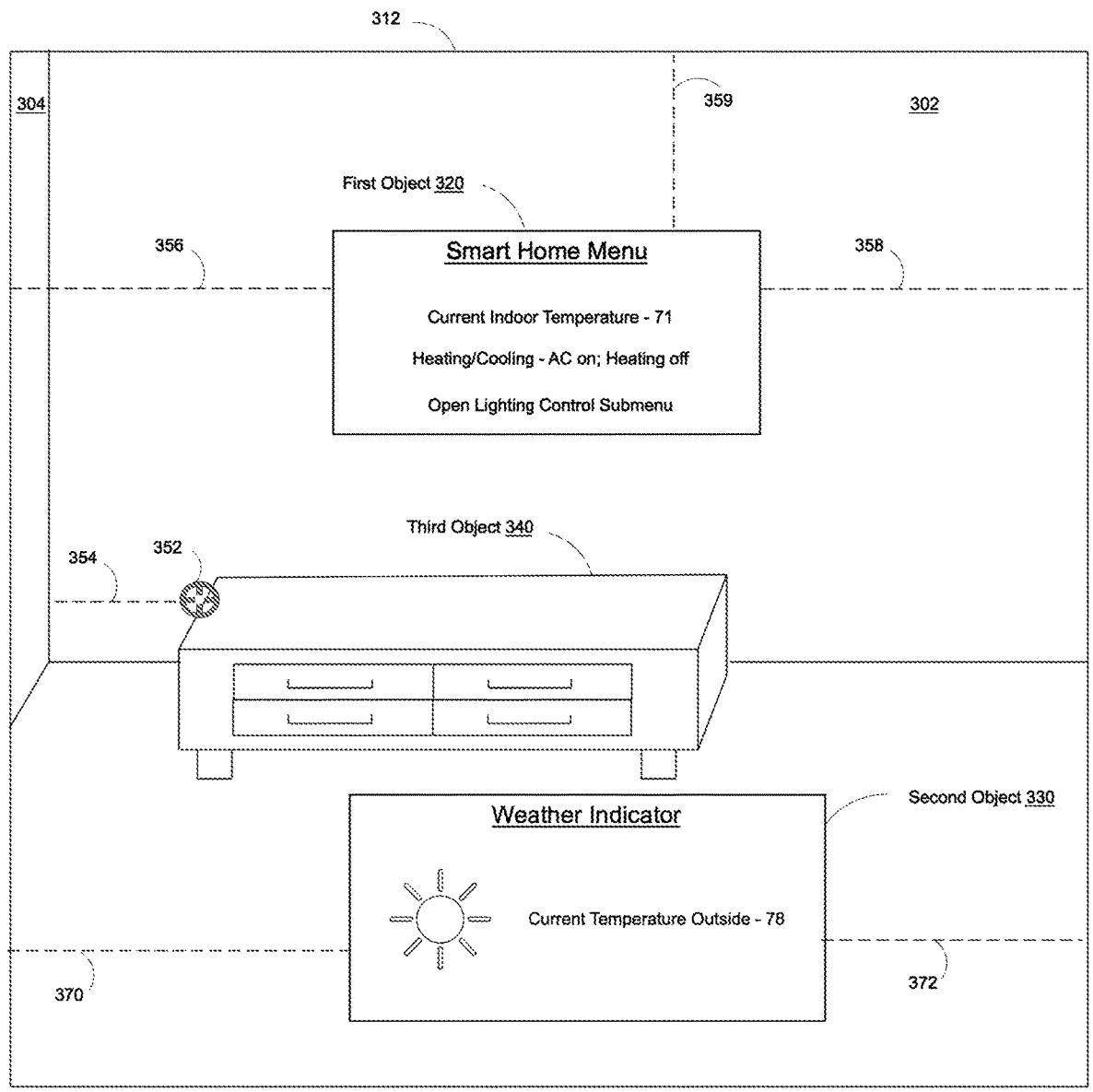
Figure 3Q:
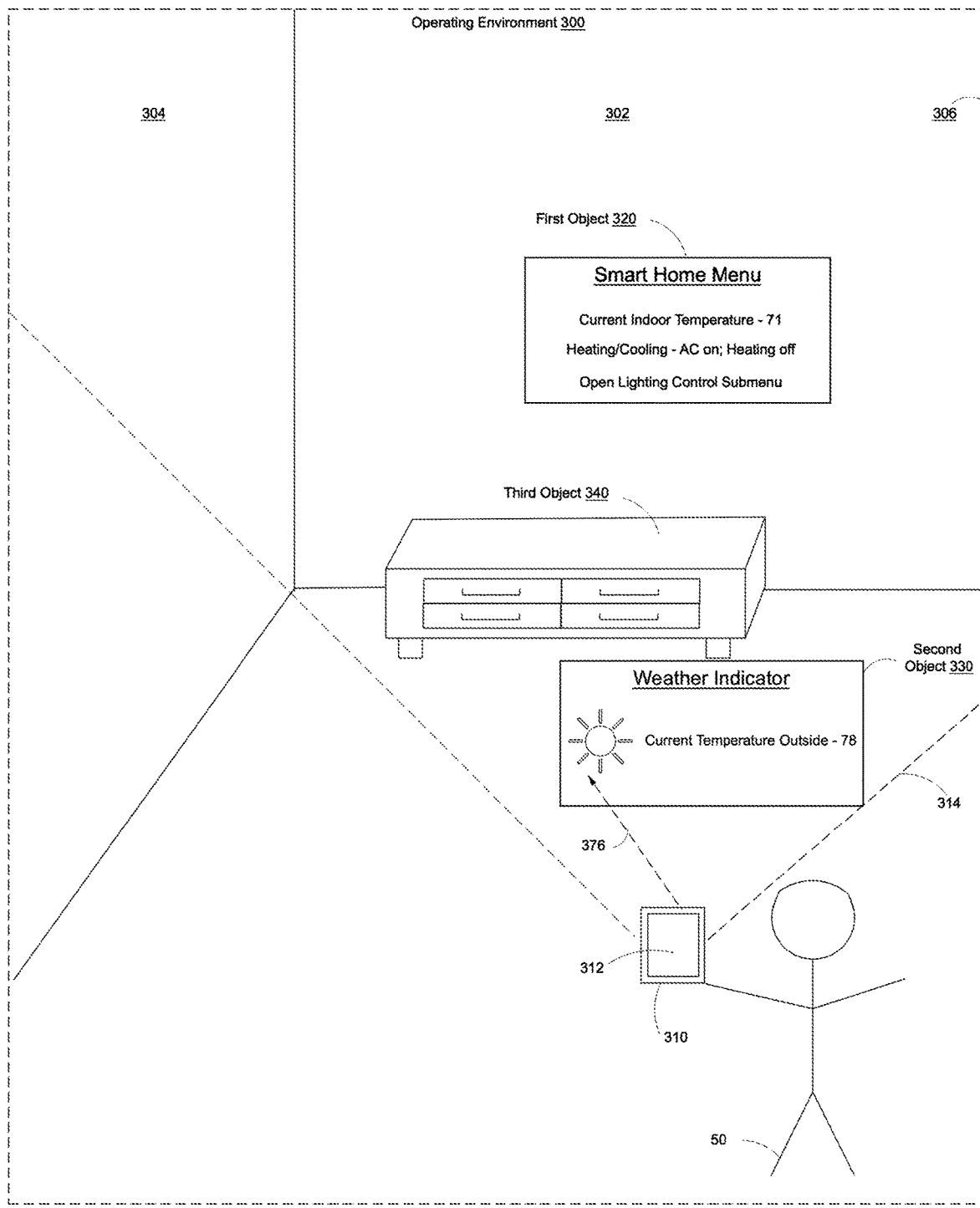
Figure 3R:
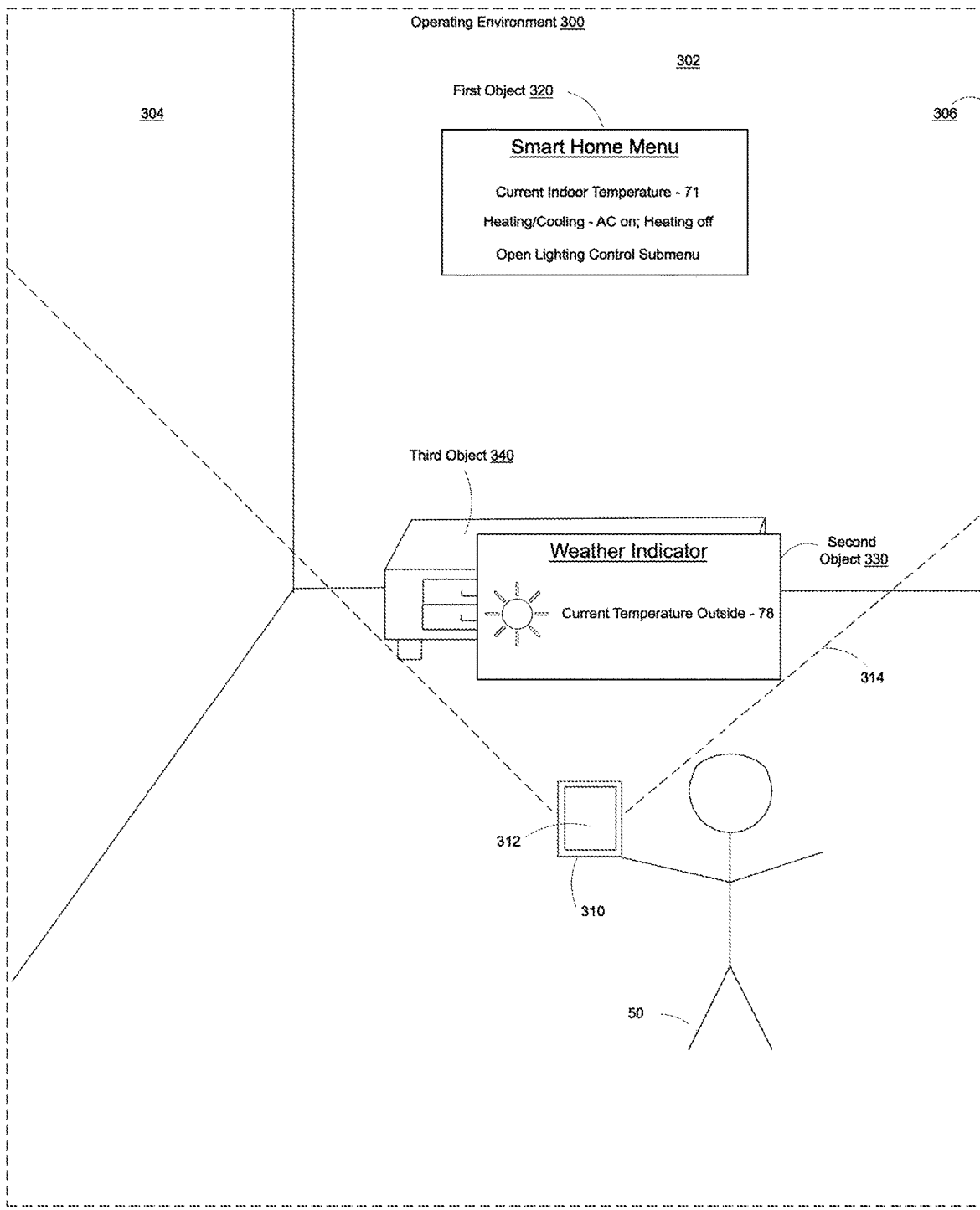
Figure 3S:
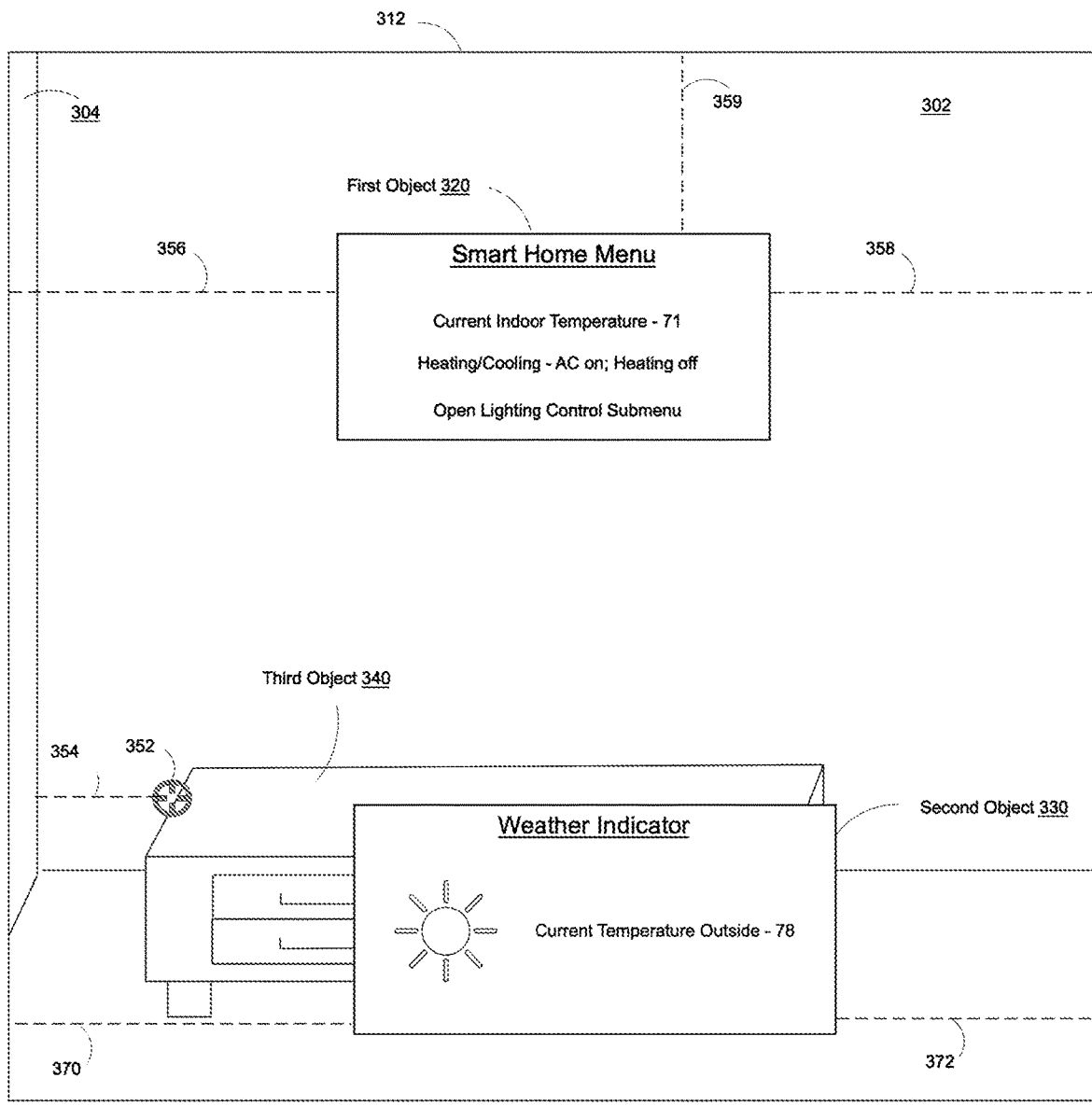

FIGS. 3A-3S are examples of an electronic device 310 blitting objects that satisfy a locked criterion in accordance with some implementations. As illustrated in FIG. 3A, a left hand of a user 50 is holding the electronic device 310. The electronic device 310 is associated with (e.g., operates according to) an operating environment 300. The operating environment 300 includes a first wall 302, a second wall 304, and a third wall 306. The electronic device 310 includes a display 312 (e.g., the display 212 in FIG. 2) that is associated with a viewable region 314 of the operating environment 300. In some implementations, the electronic device 310 generates one of the XR settings described above. In some implementations, the electronic device 310 is similar to and adapted from the electronic device 100 in FIG. 1.

In some implementations, the electronic device 310 corresponds to a head-mountable device (HMD) that includes an integrated display (e.g., a built-in display) that displays a representation of the operating environment 300. In some implementations, the electronic device 310 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 310). For example, in some implementations, the electronic device 310 slides/snaps into or otherwise attaches to the head-mountable enclosure. In some implementations, the display of the device attached to the head-mountable enclosure presents (e.g., displays) the representation of the operating environment 300. For example, in some implementations, the electronic device 310 corresponds to a mobile phone that can be attached to the head-mountable enclosure.

In some implementations, the electronic device 310 includes an image sensor, such as a scene camera. For example, the image sensor obtains image data that characterizes the operating environment 300, and the electronic device 310 composites the image data with computer-generated content in order to generate display data for display on the display 312. The display data may be characterized by an XR environment. For example, the image sensor obtains image data that represents a portion of the first wall 302 and a portion of the second wall 304, and the generated display data includes respective representations of the portion of the first wall 302 and the portion of the second wall 304 (See FIG. 3D).

In some implementations, the electronic device 310 includes a see-through display. The see-through display permits ambient light from the physical environment through the see-through display, and the representation of the physical environment is a function of the ambient light. For example, the see-through display is a translucent display, such as glasses with optical see-through. In some implementations, the see-through display is an additive display that enables optical see-through of the physical surface, such as an optical HMD (OHMD). For example, unlike purely compositing using a video stream, the additive display is capable of reflecting projected images off of the display while enabling the user to see through the display. In some implementations, the see-through display includes a photochromic lens. The HMD adds computer-generated objects to the ambient light entering the see-through display in order to enable display of the operating environment 300. For example, a see-through display permits ambient light from the operating environment 300 that includes the portion of the first wall 302 and the portion of the second wall 304, and thus the see-through display displays respective representations of the portion of the first wall 302 and the portion of the second wall 304 (See FIG. 3D).

As illustrated in FIG. 3B, the object type identifier 204 identifies a first object 320 corresponding to a "Smart Home Menu," a second object 330 corresponding to a "Weather Indicator" interface, and a third object 340 corresponding to a computer-generated credenza.

Based on first object data 322 (e.g., object data and object metadata) associated with the first object 320, the object type identifier 204 identifies the first object 320 as satisfying the locked criterion. For example, the object type identifier 204 identifies the first object 320 as a head-locked object. Accordingly, the blitter 206 blits, to the second memory 230, a first plurality of pixel values and optionally a first positional value (collectively "first values 350") associated with the first object 320. The first plurality of pixel values indicates the brightness and/or color of the first object 320 (e.g., the color/brightness of the menu text and background color/brightness). The first positional value indicates a respective position of the first object 320. For example, the first positional value indicates that the first object 320 is positioned in the center of a display and is horizontally locked with respect to the display (hereinafter "center-horizontally locked"). The first positional value may also indicate that the first object 320 is positioned at a first distance from the top edge of the display. Continuing with this example, as illustrated in FIGS. 3C and 3D, the first object 320 is center-horizontally locked with respect to the display 312. Namely, as illustrated in FIG. 3D, the first object 320 is positioned equidistant from the left and right edges of the display 312. The equidistance is indicated by equal-length indicator lines 356 and 358 (illustrated for purely explanatory purposes). Moreover, the first object 320 is positioned at the first distance from the top edge of the display 312, as indicated by first indicator line 359 (illustrated for purely explanatory purposes).

Based on second object data 332 (e.g., object data and object metadata) associated with the second object 330, the object type identifier 204 identifies the second object 330 as satisfying the locked criterion. For example, the object type identifier 204 identifies the second object 330 as a body-locked object that is locked at one meter in front of the torso of the user 50 and at 45 degrees left of the center of the torso.

Accordingly, the blitter 206 blits, to the second memory 230, a second plurality of pixel values and optionally a second positional value (collectively "second values 351") associated with the second object 330. The second plurality of pixel values indicates the brightness and/or color of the second object 330 (e.g., the color/brightness of the weather indicator text and the sun, and the background color/brightness). The second positional value indicates a respective position of the second object 330. Continuing with the previous example, the second positional value indicates a distance offset of one meter from the torso and an angular offset of 45 degrees left of the center of the torso. As illustrated in FIG. 3C, the body-locked position of the second object 330 is indicated by reticle 315. Namely, the distance offset is indicated by a distance offset set indicator 316, and the angular offset is indicated by an angular offset indicator (θ) 318. The body-locked position (indicated by the reticle 315) of the second object 330 is outside of the viewable region 314 illustrated in FIG. 3C. Thus, as illustrated in FIG. 3D, the second object 330 is not displayed on the display 312.

Based on third object data 342 (e.g., object data and object metadata) associated with the third object 340, the object type identifier 204 identifies the third object 340 as not satisfying the locked criterion. For example, the object type identifier 204 identifies the third object 340 as a world-locked object that is locked to a particular region of the operating environment 300. Based on the third object 340 not satisfying the locked criterion, the controller 202 transmits the third object data 342 to the GPU 260. The GPU 260 renders the third object data 342 in order to generate rendered image data 344 associated with the third object 342. As illustrated in FIGS. 3C and 3D, the electronic device 310 displays, on the display 312, the third object 340 as world-locked to (e.g., flush against) the first wall 302 of the operating environment 300. Moreover, as illustrated in FIG. 3D, the left edge of the third object 340 (as indicated by reticle 352, illustrated for purely explanatory purposes) is positioned at a third distance from the second wall 304. The third distance is indicated by third indicator line 354 (illustrated for purely explanatory purposes).

As illustrated in FIG. 3E, the user 50 and the electronic device 310 move rightwards away from the second wall 304, as indicated by a first movement line 362.

In response to detecting the rightwards movement (e.g., via an IMU), the electronic device 310 correspondingly moves the first object 320 in order to maintain the center-horizontally locked position of the first object 320 with respect to the display 312, as illustrated in FIGS. 3F and 3G. Namely, as illustrated in FIG. 3G, the electronic device 310 maintains the first object 320 at the equidistance from the left and right edges of the display 312, as indicated by the equal-length indicator lines 356 and 358. Moreover, the electronic device 310 maintains the first object 320 as positioned at the first distance from the top edge of the display 312, as indicated by the first indicator line 359.

On the other hand, the third object 340, is moved to a different location of the display 312 based on the rightwards movement. Namely, because the third object 340 is a world-locked object, the electronic device 310 maintains the left edge of the third object 340 at the third distance from the second wall 304, as is indicated by the third indicator line 354 illustrated in FIG. 3G. Accordingly, as compared with the position of the third object 340 on the display 312 in FIG. 3D, the third object 340 is positioned further left on the display 312 in FIG. 3G.

The second object 330 is body-locked to the user 50, as is indicated by the reticle 315 in FIG. 3F. Accordingly, the body-locked position of the second object 330 is outside of the viewable region 314 illustrated in FIG. 3F. Thus, as illustrated in FIG. 3G, the second object 330 is not displayed on the display 312.

As illustrated in FIG. 3H, the electronic device 310 detects (e.g., via the IMU) a positional change input 364 that corresponds to a positional change of the electronic device 310. The user 50 and the electronic device 310 rotate rightwards (e.g., clockwise when viewed from above) in order to initiate detection of the positional change input 364.

As illustrated in FIG. 3I, the positional change input 364 results in an updated viewable region 314 that includes the third wall 306, but not the first wall 302 or the second wall 304. Moreover, the updated viewable region 314 includes the body-locked position of the second object 330. In particular, with reference to FIG. 3I, the updated viewable region 314 includes the reticle 315, which indicates the body-locked position of the second object 330. Accordingly, as illustrated in FIGS. 3J and 3K, the electronic device 310 displays the second object 330 on the display 312. Based on the positional change input 364 and the body-locked position of the second object 330, the second object 330 is positioned at a second distance from the left edge of the display 312, and at a third distance from the right edge of the display 312. As illustrated in FIG. 3K, the second distance is indicated by a second distance indicator 365, and the third distance is indicated by a third distance indicator 366, both of which are illustrated for purely explanatory purposes.

Moreover, in response to detecting the positional change input 364, the electronic device 310 ceases to display, on the display 312, the third object 340 because the updated viewable region 314 does not include the first wall 302 to which the third object 340 is world-locked.

Moreover, in response to detecting the positional change input 364, the electronic device 310 maintains the position of the first object on the display 312, as indicated by the equal-length indicator lines 356 and 358, and the first indicator line 359, as illustrated in FIG. 3K.

As illustrated in FIG. 3L, the electronic device 310 detects (e.g., via the IMU) a positional change input 368 that corresponds to a positional change of the electronic device 310. The user 50 and the electronic device 310 rotate leftwards (e.g., counterclockwise when viewed from above) in order to initiate detection of the positional change input 368. As compared with the positional change input 364 illustrated in FIG. 3H, the positional change input 368 illustrated in FIG. 3L is associated with a smaller rotational magnitude.

In response to detecting the positional change input 368 in FIG. 3L, the electronic device 310 maintains the position of the first object 320 on the display 312, as indicated by the equal-length indicator lines 356 and 358, and the first indicator line 359, as illustrated in FIG. 3M.

On the other hand, in response to detecting the positional change input 368 in FIG. 3L, the position of the body-locked second object 330 on the display 312 changes in FIG. 3M. In particular, in response to detecting the leftwards rotation of the electronic device 310, the electronic device 310 correspondingly moves the second object 330 rightwards on the display 312. Accordingly, the second object 330 is positioned at a fourth distance from the left edge of the display 312, and at a fifth distance from the right edge of the display 312. As illustrated in FIG. 3M, the fourth distance is indicated by a fourth distance indicator 370, and the fifth distance is indicated by a fifth distance indicator 372, both of which are illustrated for purely explanatory purposes. The fourth distance illustrated in FIG. 3M is larger than the second distance illustrated in FIG. 3K, whereas the fifth distance illustrated in FIG. 3M is smaller than the third distance illustrated in FIG. 3K.

As illustrated in FIG. 3N, the electronic device 310 detects (e.g., via the IMU) a positional change input 374 that corresponds to a positional change of the electronic device 310. The user 50 and the electronic device 310 rotate leftwards (e.g., counterclockwise when viewed from above) in order to initiate detection of the positional change input 374. Based on the positional change input 374, the viewable region 314 changes to include the second wall 302 and the third object 340, as illustrated in FIG. 3O. Accordingly, as illustrated in FIG. 3P, the display 312 includes the third object 340.

Moreover, in response to detecting the positional change input 374 in FIG. 3N, the electronic device 310 maintains the position of the first object 320 on the display 312, as indicated by the equal-length indicator lines 356 and 358, and the first indicator line 359, as illustrated in FIG. 3P. Similarly, in response to detecting the positional change input 374 in FIG. 3N, the electronic device 310 maintains the position of the second object 330 on the display 312 in FIG. 3P, as is indicated by the fourth distance indicator 370 and the fifth distance indicator 372.

As illustrated in FIG. 3Q, the electronic device 310 detects (e.g., via the IMU) a positional change input 376 that corresponds to a positional change of the electronic device 310 towards the second wall 302. The positional change input 376 is characterized by a translational movement of the electronic device 310 along a portion of the operating environment 300, in contrast to a rotational movement of the electronic device 310. Accordingly, the electronic device 310 illustrated in FIG. 3R is closer to the second wall 302 than is the electronic device 310 illustrated in FIG. 3Q.

Because the third object 340 is a world-locked object that sits against (e.g., is flush with) the second wall 302, the electronic device 310 enlarges the appearance of the third object 340 based on the positional change input 376. Namely, the third object 340 illustrated in FIG. 3S appears larger on the display 312 (e.g., takes up more of the display 312) than the third object 340 illustrated on the display 312 in FIG. 3P.

On the other hand, because the first object 320 is display-locked, the electronic device 310 maintains the size and position of the first object 320 based on the positional change input 376. Namely, the electronic device 310 maintains the position and size of the first object 320 on the display 312, as indicated by the equal-length indicator lines 356 and 358, and the first indicator line 359, as illustrated in FIG. 3S.

Similarly, because the second object 330 is body-locked, the electronic device 310 maintains the size and position of the second object 330 based on the positional change input 376. Namely, the electronic device 310 maintains the position and size of the second object 330 on the display 312 in FIG. 3S, as is indicated by the fourth distance indicator 370 and the fifth distance indicator 372.

Figure 4:
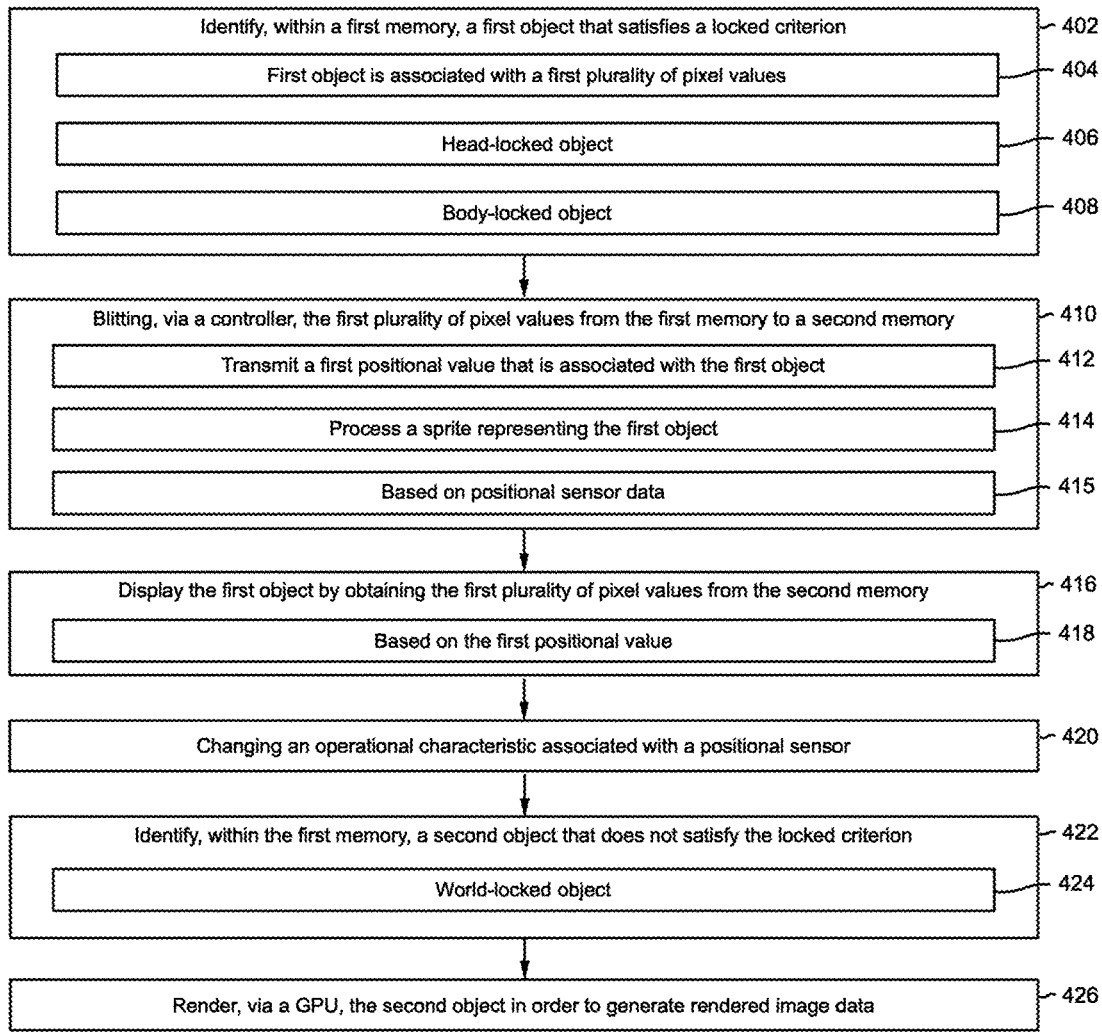
FIG. 4 is an example of a flow diagram of a method of blitting an object that satisfies a locked criterion in accordance with some implementations.

FIG. 4 is an example of a flow diagram of a method 400 of blitting an object that satisfies a locked criterion in accordance with some implementations. In various implementations, the method 400 or portions thereof is performed by an electronic device including a controller and a display (e.g., the electronic device 100 in FIG. 1 or the electronic device 310 in FIGS. 3A-3S). In various implementations, the method 400 or portions thereof is performed by the system 200 illustrated in FIG. 2. In various implementations, the method 400 or portions thereof is performed by a head-mountable device (HMD). In some implementations, the method 400 is performed by processing logic, including hardware, firmware, software, or a combination thereof. In some implementations, the method 400 is performed by a processor executing code stored in a non-transitory computer-readable medium (e.g., a memory). In various implementations, some operations in method 400 are, optionally, combined and/or the order of some operations is, optionally, changed.

As represented by block 402, the method 400 includes identifying, within a first memory, a first object that satisfies a locked criterion. For example, the first object corresponds to a two-dimensional (2D) object. As another example, the first object corresponds to a heads-up display (HUD), which may provide status information, such as time of day, outside temperature, etc. As represented by block 404, the first object is associated with a first plurality of pixel values. As represented by block 406, in some implementations, the first object corresponds to a head-locked object. For example, with reference to FIG. 3B, the object type identifier 204 identifies the first object 320, corresponding to a head-locked object, that satisfies the locked criterion. As represented by block 408, in some implementations, the first object corresponds to a body-locked object. For example, with reference to FIG. 3B, the object type identifier 204 identifies the second object 330, corresponding to a body-locked object, that satisfies the locked criterion.

As represented by block 410, the method 400 includes blitting, via a controller (e.g., a memory controller), the first plurality of pixel values from the first memory to a second memory. For example, blitting corresponds to a bitwise copy and paste operation. As another example, blitting corresponds to a bit-blit operation that includes combining bitmaps according to a Boolean function. In some implementations, the method 400 includes identifying a reference location within the first memory that is associated with the first object, and blitting the first plurality of pixel values to the second memory according to the reference location. In some implementations, blitting the first plurality of pixel values includes applying an affine transform to the first plurality of pixel values associated with a body-locked object.

As represented by block 412, in some implementations, blitting the first plurality of pixel values includes transmitting, from the first memory to the second memory, a first positional value that is associated with the first object. For example, the first positional value corresponds to a point or region of a display. As one example, with reference to FIGS. 3B, the controller 202 obtains the first object data 322, which includes corresponding object metadata that includes the first positional value associated with the first object 320. Continuing with this example, the first positional value indicates that the first object 320 is to be positioned center-horizontally locked with respect to a display and at the first distance from the upper edge of the display. As another example, with reference to FIG. 3C, the first positional value is indicative of a position of a body-locked object that is locked to a portion of a body of a user. Continuing with this example, the first positional value indicates a distance offset and an angular offset with respect to the portion of the body of the user.

As represented by block 414, in some implementations, the first object is represented by a sprite, and blitting the first plurality of pixel values includes processing the sprite. For example, the sprite is a 2D bitmap, such as a rectangle of pixel values. In some implementations, a sprite is stored in a separate memory from the display memory such that processing the sprite does not disturb the display memory. For example, with reference to FIG. 2, a sprite is stored in the first memory 220, which is separate from the second memory 230 associated with the display 212.

As represented by block 415, in some implementations, blitting the first plurality of pixel values is based on a function of positional sensor data from a positional sensor (e.g., an IMU) integrated in an electronic device or HMD. For example, when the first object corresponds to a display-locked object, the method 400 includes blitting the first plurality of pixel values in response to determining that the positional sensor data indicates a change from a 6 DOF mode of operation to a 0 DOF mode. As another example, when the first object corresponds to a body-locked object, the method 400 includes blitting the first plurality of pixel values in response to determining that the positional sensor data indicates a change from a 6 DOF mode of operation to a 3 DOF mode.

As represented by block 416, the method 400 includes displaying, on a display, the first object by obtaining the first plurality of pixel values from the second memory. For example, with reference to FIG. 2, the display driver 210 obtains the first plurality of pixel values from the second memory 230 in order to drive the display 212. As represented by block 418, in some implementations, displaying the first object is based on a function of the first positional value associated with the first object. To that end, in some implementations, the method 400 includes obtaining the first positional value from the second memory, identifying a corresponding plurality of pixels of the display based on the first positional value, and displaying the first plurality of pixel values at the corresponding plurality of pixels of the display. For example, with reference to FIG. 2, the display pixel identifier 211 identifies a corresponding plurality of pixels of the display 212 based on the first positional value (retrieved from the second memory 230), the first plurality of pixel values, and characteristics(s) of the display 212 (e.g., size and/or resolution of the display 212). In some implementations, the method 400 includes reducing a resource utilization associated with the display based on (e.g., in response to) identifying the first object. For example, with reference to FIG. 2, the display driver 210 dims a portion of the display 212 at which a display-locked object is currently displayed or will be displayed.

As represented by block 420, in some implementations, the method 400 includes changing an operational value associated with a positional sensor from a first value to a second value based on (e.g., in response to) identifying the first object that satisfies the locked criterion. For example, with reference to FIG. 2, the sensor controller 250 reduces the resource utilization of the positional sensor(s) 252. In some implementations, a positional sensor generates degree-of-freedom (DOF) information associated with the electronic device, and reducing the resource utilization corresponds to changing the positional sensor from generating 6 DOF information to generating 3 DOF or 0 DOF information. In some implementations, the operational value corresponds to a power level value (whether or not in a power savings mode), mode of operation value (e.g., 6 DOF/3 DOF/0 DOF mode, calibration mode, test mode, or run time mode), etc.

As represented by block 422, in some implementations, the method 400 includes identifying, within the first memory, a second object that does not satisfy the locked criterion. As represented by block 424, in some implementations, the second object is a world-locked object. For example, the second object is world-locked with respect to an environment (e.g., an XR environment). As one example, with reference to FIG. 3D, the third object 340 is world-locked to (e.g., flush against) the first wall 302, at a third distance (indicated by the third indicator line 354) from the second wall 304. Moreover, as illustrated in FIGS. 3E-3G, based on a rightwards movement as indicated by the first movement line 362 of the electronic device 310, the electronic device 310 correspondingly moves the third object 340 leftwards on the display 312, in order to maintain the third object 340 as world-locked to the first wall 202, at the third distance from the second wall 304.

Moreover, as represented by block 426, in some implementations, the method 400 includes rendering, via a graphics processing unit (GPU), the second object in order to generate rendered image data, and transmitting the rendered image data to the display in order to display the second object. Examples of GPU rendering include wireframe rendering, polygon-based rendering, scanline rendering, ray tracing, and radiosity. As compared with blitting, GPU rendering is more computationally expensive.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
   at an electronic device with a controller and a display:
   identifying, within a first memory, a first object that satisfies a locked criterion, wherein the first object is associated with a first plurality of pixel values, wherein identifying the first object that satisfies the locked criterion includes determining that the first object is a display-locked object;
   in response to determining that the first object is the display-locked object blitting, via the controller, the first plurality of pixel values from the first memory to a second memory; and
   displaying, on the display, the first object by obtaining the first plurality of pixel values from the second memory.

2. The method of claim 1, wherein the first object corresponds to a two-dimensional (2D) object.

3. The method of claim 1, wherein the first object corresponds to a heads-up display (HUD).

4. The method of claim 1, wherein the electronic device includes a positional sensor that outputs positional sensor data, and wherein blitting the first plurality of pixel values is based on a function of the positional sensor data.

5. The method of claim 4, wherein blitting the first plurality of pixel values based on the function of the positional sensor data includes:
   detecting a change of a mode of operation of the positional sensor based on the positional sensor data; and
   blitting the first plurality of pixel values in response to detecting the change of the mode of operation of the positional sensor.

6. The method of claim 1, wherein blitting the first plurality of pixel values includes transmitting, from the first memory to the second memory, a first positional value that is associated with the first object.

7. The method of claim 6, further comprising:
   obtaining the first positional value from the second memory; and
   identifying a corresponding plurality of pixels of the display based on the first positional value;
   wherein displaying the first object includes displaying the first plurality of pixel values at the corresponding plurality of pixels of the display.

8. The method of claim 7, wherein the first positional value is indicative of a position on the display.

9. The method of claim 1, wherein blitting the first plurality of pixel values includes:
   identifying a reference location within the first memory that is associated with the first object; and
   blitting the first plurality of pixel values according to the reference location.

10. The method of claim 1, wherein the first object is represented by a sprite, and wherein blitting the first plurality of pixel values includes processing the sprite.

11. The method of claim 1, wherein the first object is displayed at a first position on the display, and wherein the electronic device includes a positional sensor, the method further comprising:
    detecting, via the positional sensor, a positional change input that corresponds to a positional change of the electronic device; and
    in response to detecting the positional change input, maintaining display of the first object at the first position on the display by obtaining the first plurality of pixel values from the second memory.

12. The method of claim 1, wherein the electronic device includes a positional sensor, the method further comprising changing an operational value associated with the positional sensor from a first value to a second value based on identifying the first object that satisfies the locked criterion.

13. The method of claim 12, wherein the first value is associated with a first resource utilization level that is greater than a second resource utilization level that is associated with the second value.

14. The method of claim 12, wherein changing the operational value from the first value to the second value includes changing the positional sensor from operating in a standard power mode to operating in a low power mode.

15. The method of claim 12, wherein changing the operational value from the first value to the second value includes changing the positional sensor from a first degree-of-freedom (DOF) mode of operation to a second DOF mode of operation.

16. The method of claim 15, wherein the first DOF mode of operation corresponds to a 6 DOF mode and the second DOF mode of operation corresponds to a 0 DOF mode.

17. The method of claim 1, further comprising reducing a resource utilization associated with the display based on identifying the first object.

18. The method of claim 1, wherein the electronic device includes a graphics processing unit (GPU) that is different from the controller, the method further comprising:
   obtaining a second object from the first memory;
   determining that the second object does not satisfy the locked criterion;
   foregoing blitting the second object based on the second object not satisfying the locked criterion;
   rendering, via the GPU, the second object in order to generate rendered image data, based on the second object not satisfying the locked criterion; and
   transmitting the rendered image data to the display in order to display the second object.

19. The method of claim 18, wherein the second object corresponds to a world-locked object.

20. The method of claim 1, wherein determining that the first object is the display-locked object is based on object metadata associated with the first object.

21. A system comprising:
   a controller to:
      identify, within a first memory, a first object that satisfies a locked criterion, wherein the first object is associated with a first plurality of pixel values, wherein identifying the first object that satisfies the locked criterion includes determining that the first object is a display-locked object, and
      in response to determining that the first object is the display-locked object, blit the first plurality of pixel values from the first memory to a second memory;
   a display to display the first object; and
   a display driver to obtain the first plurality of pixel values from the second memory in order to drive the display with the first plurality of pixel values.

22. An electronic device comprising:
   a controller to:
      identify, within a first memory, a first object that satisfies a locked criterion, wherein identifying the first object that satisfies the locked criterion includes determining that the first object is a display-locked object, and
      in response to determining that the first object is the display-locked object, blit the first plurality of pixel values from the first memory to a second memory;
   a display to display the first object; and
   a display driver to obtain the first plurality of pixel values from the second memory in order to drive the display with the first plurality of pixel values.

* * * * *